(12) United States Patent
Depallens et al.

(10) Patent No.: US 9,191,758 B2
(45) Date of Patent: Nov. 17, 2015

(54) MANUFACTURING PROCESS FOR A CUSTOM FIT IN-EAR MONITOR UTILIZING A SINGLE PIECE DRIVER MODULE

(71) Applicant: Logitech Europe, S.A., Lausanne (CH)

(72) Inventors: Philippe Depallens, San Clemente, CA (US); Joseph A. Saggio, Jr., Anaheim Hills, CA (US); Todd W. Lansinger, Trabuco Canyon, CA (US)

(73) Assignee: Logitech Europe, S.A., Lausanne (CH)

( * ) Notice: Subject to any disclaimer, the term of this patent is extended or adjusted under 35 U.S.C. 154(b) by 202 days.

(21) Appl. No.: 14/062,053

(22) Filed: Oct. 24, 2013

(65) Prior Publication Data
US 2015/0113795 A1 Apr. 30, 2015

Related U.S. Application Data

(63) Continuation of application No. 14/061,885, filed on Oct. 24, 2013, now Pat. No. 9,042,589.

(51) Int. Cl.
| | |
|---|---|
| *H04R 25/00* | (2006.01) |
| *H04R 31/00* | (2006.01) |
| *B33Y 80/00* | (2015.01) |
| *H04R 1/10* | (2006.01) |
| *B29C 67/00* | (2006.01) |

(52) U.S. Cl.
CPC ............ *H04R 25/604* (2013.01); *B33Y 80/00* (2014.12); *H04R 1/1091* (2013.01); *H04R 31/00* (2013.01); *B29C 67/0059* (2013.01); *H04R 2460/00* (2013.01)

(58) Field of Classification Search
CPC ...... H04R 1/04; H04R 1/1058; H04R 1/1075; H04R 25/48; H04R 25/604; H04R 25/608; H04R 2225/023; H04R 2225/025; H04R 2225/59; H04R 2225/77; H04R 31/00; B33Y 80/00; Y10T 29/49002; Y10T 29/49005; Y10T 29/4908; Y10T 29/49128
USPC ............. 29/592.1, 594, 609, 609.1; 381/170, 381/313, 355, 356, 358, 360, 361, 368, 369, 381/380
See application file for complete search history.

(56) References Cited

U.S. PATENT DOCUMENTS

| | | | | |
|---|---|---|---|---|
| 4,163,877 | A * | 8/1979 | Schonstedt | 324/226 |
| 6,427,018 | B1 * | 7/2002 | Keliiliki | 381/381 |
| 6,772,853 | B2 * | 8/2004 | Yang | 181/129 |
| 6,829,365 | B1 * | 12/2004 | Kim | 381/370 |
| 7,116,795 | B2 * | 10/2006 | Tuason et al. | 381/386 |
| 7,231,056 | B2 * | 6/2007 | Chen | 381/381 |
| 7,251,335 | B1 * | 7/2007 | Chen | 381/71.6 |
| 7,499,562 | B2 * | 3/2009 | Shim | 381/382 |
| 7,858,897 | B2 * | 12/2010 | Beranger | 219/121.14 |
| 7,971,338 | B2 * | 7/2011 | Yang et al. | 29/594 |
| 2003/0002706 | A1 * | 1/2003 | Keliiliki | 381/381 |

(Continued)

*Primary Examiner* — Paul D Kim
(74) *Attorney, Agent, or Firm* — Patent Law Office of David G. Beck

(57) ABSTRACT

A method of fabricating a custom-fit in-ear-monitor (IEM) is provided that utilizes a pre-tuned, single piece driver module to simplify fabrication and reduce cost while insuring that the performance of the IEM consistently meets the acoustic goals set for the device. During fabrication the driver module, the drivers coupled to the module's driver ports, and the crossover circuit are installed in a custom-fit IEM shell such that the module's acoustic output is aligned with the output surface of the IEM shell. After installing the device components within the IEM shell, the shell is sealed.

25 Claims, 16 Drawing Sheets

(56) References Cited

U.S. PATENT DOCUMENTS

| | | | |
|---|---|---|---|
| 2006/0159279 A1* | 7/2006 | Kuo et al. | 381/74 |
| 2006/0281502 A1* | 12/2006 | Chang et al. | 455/575.2 |
| 2007/0036385 A1 | 2/2007 | Harvey et al. | |
| 2008/0119244 A1* | 5/2008 | Malhotra | 455/575.1 |
| 2009/0233652 A1* | 9/2009 | Yang | 455/569.1 |
| 2009/0279731 A1* | 11/2009 | Wu | 381/386 |
| 2011/0159229 A1* | 6/2011 | Doehle et al. | 428/81 |
| 2013/0251186 A1* | 9/2013 | Matsuo et al. | 381/380 |
| 2013/0269448 A1* | 10/2013 | Berger et al. | 73/861.27 |

* cited by examiner

MANUFACTURING PROCESS FOR A CUSTOM FIT IN-EAR MONITOR UTILIZING A SINGLE PIECE DRIVER MODULE

CROSS-REFERENCE TO RELATED APPLICATION

This application is a continuation of U.S. patent application Ser. No. 14/061,885, filed 24 Oct. 2013, now U.S. Pat. No. 9,042,589, the disclosure of which is incorporated herein by reference for any and all purposes.

FIELD OF THE INVENTION

The present invention relates generally to audio monitors and, more particularly, to an in-ear multi-driver earpiece design optimized for manufacturability.

BACKGROUND OF THE INVENTION

In-ear monitors, also referred to as IEMs, canal phones and stereo earphones, are commonly used to listen to both recorded and live music. A typical recorded music application would involve plugging a pair of monitors into a music player such as a CD player, flash or hard drive based MP3 player, home stereo or similar device using the device's headphone socket. Alternately, the monitors can be wirelessly coupled to the music player. In a typical live music application, the on-stage musician uses the monitors in order to hear his or her own music during a performance. In this case, the monitor is either plugged into a wireless belt pack receiver or directly connected to an audio distribution device such as a mixer or a headphone amplifier. This type of monitor offers numerous advantages over the use of stage loudspeakers, including improved gain-before-feedback, minimization/elimination of room/stage acoustic effects, cleaner mix through the minimization of stage noise, increased mobility for the musician and the reduction of ambient sounds. Many of these same advantages may be gained by an audience member using in-ear monitors to listen to a live performance.

In-ear monitors are quite small and are normally worn just outside the ear canal. As a result, the acoustic design of the monitor must lend itself to a very compact design utilizing small components. Some monitors are custom fit (i.e., custom molded) while others use a generic "one-size-fits-all" earpiece. Generic earpieces may include a removable and replaceable eartip sleeve that provides a limited degree of customization, e.g., choice of color, size, material and shape.

Prior art in-ear monitors use either diaphragm-based receivers, armature-based receivers, or a combination of the two. Broadly characterized, a diaphragm is a moving-coil speaker with a paper or mylar diaphragm. Since the cost to manufacture a diaphragm is relatively low, they are widely used in many common audio products (e.g., ear buds). In contrast to the diaphragm approach, an armature receiver utilizes a piston design. Due to the inherent cost of armature receivers, however, they are typically only found in hearing aids and high-end in-ear monitors.

Diaphragm receivers, due to the use of moving-coil speakers, suffer from several limitations. First, because of the size of the diaphragm assembly, a typical earpiece is limited to a single diaphragm. This limitation precludes achieving optimal frequency response (i.e., a flat or neutral response) through the inclusion of multiple diaphragms. Second, diaphragm-based monitors have significant frequency roll off above 4 kHz. As the desired upper limit for the frequency response of a high-fidelity monitor is at least 15 kHz, diaphragm-based monitors cannot achieve the desired upper frequency response while still providing accurate low frequency response.

Armatures, also referred to as balanced armatures, were originally developed by the hearing aid industry. This type of driver uses a magnetically balanced shaft or armature within a small, typically rectangular, enclosure. As a result of this design, armature drivers are not reliant on the size and shape of the enclosure, i.e., the ear canal, for tuning as is the case with diaphragm-based monitors. Typically, the length of tubing attached to the armature in combination with an acoustic filter is used to tune the armature. A single armature is capable of accurately reproducing low-frequency audio or high-frequency audio, but incapable of providing high-fidelity performance across all frequencies.

To overcome the limitations associated with both diaphragm and armature drivers, some in-ear monitors use either a combination of both diaphragm and armature drivers or multiple armatures. In such a multi-driver arrangement, a crossover network is used to divide the frequency spectrum into multiple regions, i.e., low and high or low, medium, and high. Separate, optimized drivers are then used for each acoustic region. Generally either a single delivery tube or a pair of delivery tubes delivers the sound produced by the drivers to the output face of the earpiece.

As briefly described above, a variety of techniques are typically used to tune driver output as well as achieve the desired IEM acoustic performance for a specific set of IEMs, these techniques including optimization of driver placement, tubing diameter and length, damper/filter selection, and port placement and size. In general, these techniques are integrated into the fabrication process used to manufacture a pair of molded in-ear monitors. While these techniques may be used to successfully achieve the desired performance, due to the labor intensive nature of these processes both IEM cost and manufacturing time are dramatically affected. Accordingly, what is needed is an IEM manufacturing technique that reduces fabrication complexity while still achieving the requisite acoustic performance. The present invention provides such an IEM manufacturing technique.

SUMMARY OF THE INVENTION

A method of fabricating a custom-fit in-ear-monitor (IEM) is provided that includes the steps of (i) obtaining an ear mold for a specific user, (ii) fabricating a custom-fit ear mold shell based on the ear mold, (iii) installing a plurality of drivers into a plurality of driver ports corresponding to a single piece driver module in order to form a driver assembly, (iv) electrically connecting a crossover circuit to the plurality of drivers, the crossover circuit configured to receive an electrical signal from an audio source that is external to the custom-fit IEM and to provide separate input signals to each of the plurality of drivers based on the electrical signal, (iv) installing the driver assembly and the crossover circuit into the custom-fit ear mold shell, during which at least one sound bore within an acoustic output member of the driver module is acoustically coupled to an acoustic output surface of the custom-fit ear mold shell and acoustically coupled to the plurality of driver ports via a plurality of sound ducts within the body of the driver module, and (v) sealing the driver assembly into the custom-fit ear mold shell.

The method may further include the step of scanning the ear mold to generate an ear mold data file, and then fabricating the custom-fit ear mold shell using a 3D printer.

The method may further include the steps of scanning the ear mold to generate an ear mold data file, analyzing the ear mold data file, modifying the ear mold data file to include a plurality of internal features compatible with the driver assembly, generating a final data file based on the modified ear mold data file, and then fabricating the custom-fit ear mold shell using a 3D printer and the final data file. In another aspect, the steps of obtaining the ear mold, scanning the ear mold and manufacturing the custom-fit ear mold shell with a 3D printer may be performed at a first geographic location (e.g., a store) while the steps of analyzing and modifying the ear mold file and generating the final data file may be performed at a second geographic location (e.g., a central processing site) that is geographically remote from the first geographic location.

The method may include the step of fabricating the entire single piece driver module, or at least a portion of the single piece driver module such as one or more of the driver ports and the acoustic output member, from an elastomeric material, and may further include the step of selecting the elastomeric material from the group consisting of silicone, neoprene, ethylene propylene diene monomer, nitrile rubber, nitrile, polyvinyl chloride, nitrile/PVC blends, and urethane.

The method may include the step of fabricating at least one locking feature on an external surface of the driver module, where the at least one locking feature is configured to capture and hold the driver module within the custom-fit ear mold shell.

The method may include the steps of (i) fabricating at least a portion of the single piece drive module from an elastomeric material, (ii) forming a first sound bore and a second sound bore within the acoustic output member of the driver module, (iii) forming a first sound duct within the body of the driver module, where the first sound duct acoustically couples a first driver port of the plurality of driver ports to the first sound bore of the acoustic output member, and (iv) forming a second sound duct within the body of the driver module, where the second sound duct acoustically couples a second driver port of the plurality of driver ports to the second sound bore of the acoustic output member. The method may further include the step of forming a third sound duct within the body of the driver module, where the third sound duct acoustically couples a third driver port of the plurality of driver ports to the second sound bore of the acoustic output member. The method may further include the steps of selecting and coupling a high-frequency driver to the first driver port, selecting and coupling a mid-frequency driver to the second driver port, and selecting and coupling a low-frequency driver to the third driver port. The method may further include the steps of forming the first sound bore with a first circular cross-section and forming the second sound bore with a second circular cross-section; alternately, forming the first sound bore with a first circular cross-section and forming the second sound bore with a second circular cross-section where the first circular cross-section is larger than the second circular cross-section; alternately, forming the first sound bore with a first circular cross-section and forming the second sound bore with a second circular cross-section where the first circular cross-section is concentric with the second circular cross-section; alternately, forming the first sound bore with a shaped, non-circular cross-section and forming the second sound bore with a circular cross-section; alternately, forming the first sound bore with a first shaped, non-circular cross-section and forming the second sound bore with a second shaped, non-circular cross-section.

The method may further include the step of mounting a printed circuit board (PCB) containing the crossover circuit to the single piece driver module.

The method may further include the step of sealing the driver assembly into the custom-fit ear mold shell by filling the custom-fit ear mold shell with a filler that captures and holds the driver assembly and the crossover circuit within the custom-fit ear mold shell.

The method may further include the step of sealing the driver assembly into the custom-fit ear mold shell by closing an opening in the custom-fit ear mold shell with a pre-fabricated faceplate.

The method may further include the step of blocking off one of the plurality of driver ports prior to sealing the driver assembly into the custom-fit ear mold shell.

The method may further include the step of acoustically coupling one of the driver ports to the ambient environment external to the custom-fit IEM.

The method may further include the step of adjusting an acoustic output extension that is slidably mounted to the acoustic output member and which is adjustable between a non-extended position and an extended position.

In another aspect of the invention, a method of fabricating a custom-fit in-ear-monitor (IEM) is provided that includes the steps of (i) creating an ear mold for a specific user, (ii) fabricating a custom-fit ear mold shell based on the ear mold, wherein during the step of fabricating the custom-fit ear mold shell a cavity is formed within the custom-fit ear mold shell that is configured to receive and couple to a preconfigured driver assembly, (iii) installing the preconfigured driver assembly into the custom-fit ear mold shell, wherein the step of installing the preconfigured driver assembly further includes the step of acoustically coupling at least one sound bore corresponding to an acoustic output member of the preconfigured driver assembly to an acoustic output surface of the custom-fit ear mold shell, and (iv) sealing the preconfigured driver assembly into the custom-fit ear mold shell. The steps of fabricating the custom-fit ear mold shell and forming a cavity within the custom-fit ear mold shell may occur during the same processing step. The acoustic output surface may be created during the step of fabricating the custom-fit ear mold shell.

A further understanding of the nature and advantages of the present invention may be realized by reference to the remaining portions of the specification and the drawings.

DESCRIPTION OF THE SPECIFIC EMBODIMENTS

In the following text, the terms "in-ear monitor", "IEM", "monitor", "canal phone", "earbud" and "earphone" may be used interchangeably. Similarly, the terms "custom" IEM, "custom fit" IEM and "molded" IEM may be used interchangeably and refer to an IEM that is molded to fit within the ear of a specific user. Similarly, the terms "sound delivery tube", "sound delivery bore", "sound bore" and "sound duct" may be used interchangeably. Unless otherwise noted, the term "driver" as used herein refers to either an armature driver or a diaphragm driver. It should be understood that identical element symbols used on multiple figures refer to the same component, or components of equal functionality. Additionally, the accompanying figures are only meant to illustrate, not limit, the scope of the invention and should not be considered to be to scale.

Figure 1:
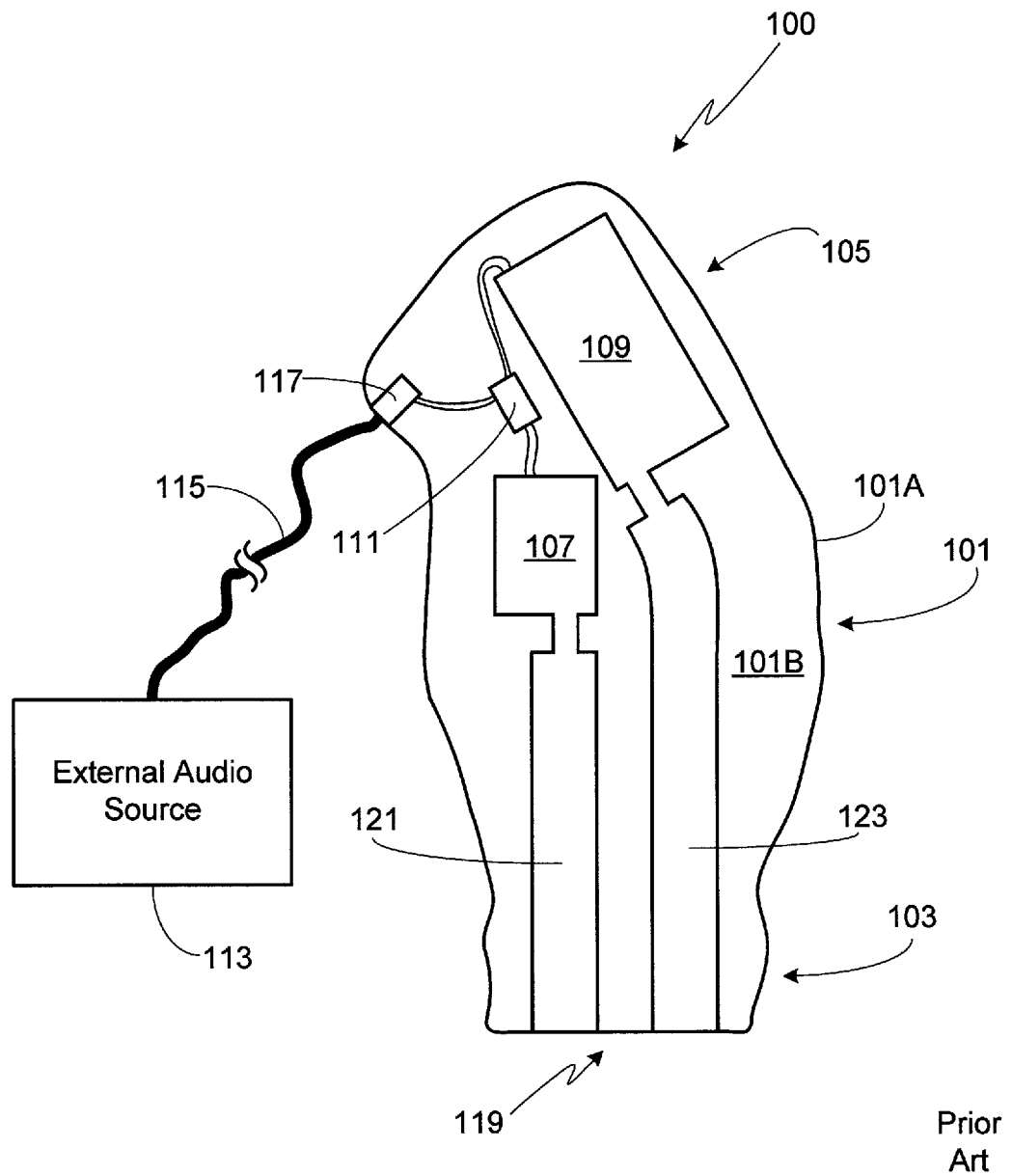
FIG. 1 illustrates the primary elements of a custom fit in-ear monitor according to the prior art.

FIG. 1 illustrates the primary elements of a custom fit in-ear monitor 100 according to the prior art. Being a custom fit IEM, enclosure 101 of monitor 100 is molded or otherwise custom fit to a particular ear of a specific end user. In general, enclosure 101 includes an outer shell 101A based on a mold of the end user's ear and an inner filler 101B that is added after the various drivers, tubing, dampers, and circuitry are installed, positioned and tuned to achieve the desired IEM acoustic performance. Enclosure 101 includes an ear canal portion 103 designed to fit within the outer ear canal of the user and an concha portion 105 designed to fit within the concha portion of the ear. In the illustrated example, monitor 100 includes a pair of armature drivers 107 and 109, driver 107 being a low-frequency driver and driver 109 being a high-frequency driver. A circuit, such as a passive crossover circuit or an active crossover circuit, mounted on a circuit board 111 provides input to armature drivers 107 and 109. Circuit 111, and therefore IEM 100, is coupled to an external audio source 113 via a cable 115, cable 115 transmitting electrical signals from audio source 113 to circuit 111, the electrical signals representative of the sound to be produced by IEM 100. Cable 115 is either hard-wired to IEM 100, or electrically connected to IEM 100 via a cable socket 117 that is integrated within enclosure 101. As used herein, the term "external audio source" refers to any of a variety of possible audio sources, all of which are external and independent of the IEM to which they are attached, and all of which produce electrical signals that are representative of the sound to be generated by the IEM. This is in distinct contrast to a hearing aid in which the audio source, i.e., one or more microphones and typically an audio amplifier/sound processor, is integrated within the hearing aid. Thus while a hearing aid allows the user to listen to an external source of sound by converting the acoustic sound source to an electrical signal with the internal microphone and audio processor, the hearing aid itself is not coupled to the external audio source. Exemplary external audio sources include, but are not limited to, audio receivers, audio mixers, music players, headphone amplifiers, DVD players, cellular telephones, and handheld electronic gaming devices. As is well known in the industry, in-ear monitor 100 may also include a wireless receiver (e.g., a Bluetooth receiver) or be coupled to a wireless receiver via cable 115, thus allowing IEM 100 to wirelessly receive electrical signals representative of the audio source from the combination of a wireless transmitter and the external audio source.

The output from drivers 107 and 109 is delivered to the end surface 119 of the IEM via a pair of delivery tubes 121 and 123, respectively. Typical dimensions for sound delivery tubes, such as tubes 121 and 123, are an inside diameter (ID) of 1.9 millimeters and an outside diameter (OD) of 2.95 millimeters. Given that end surface 119 of a custom fit earpiece is approximately 9 millimeters by 11 millimeters, it is clear that such earpieces are sufficiently large for dual sound tubes. It will be appreciated that while sound delivery tubes 121 and 123 are shown as being straight, or substantially straight, IEM 100 will often use curved tubes to accommodate the contours of the ear canal to which the IEM is fit.

Figure 2:
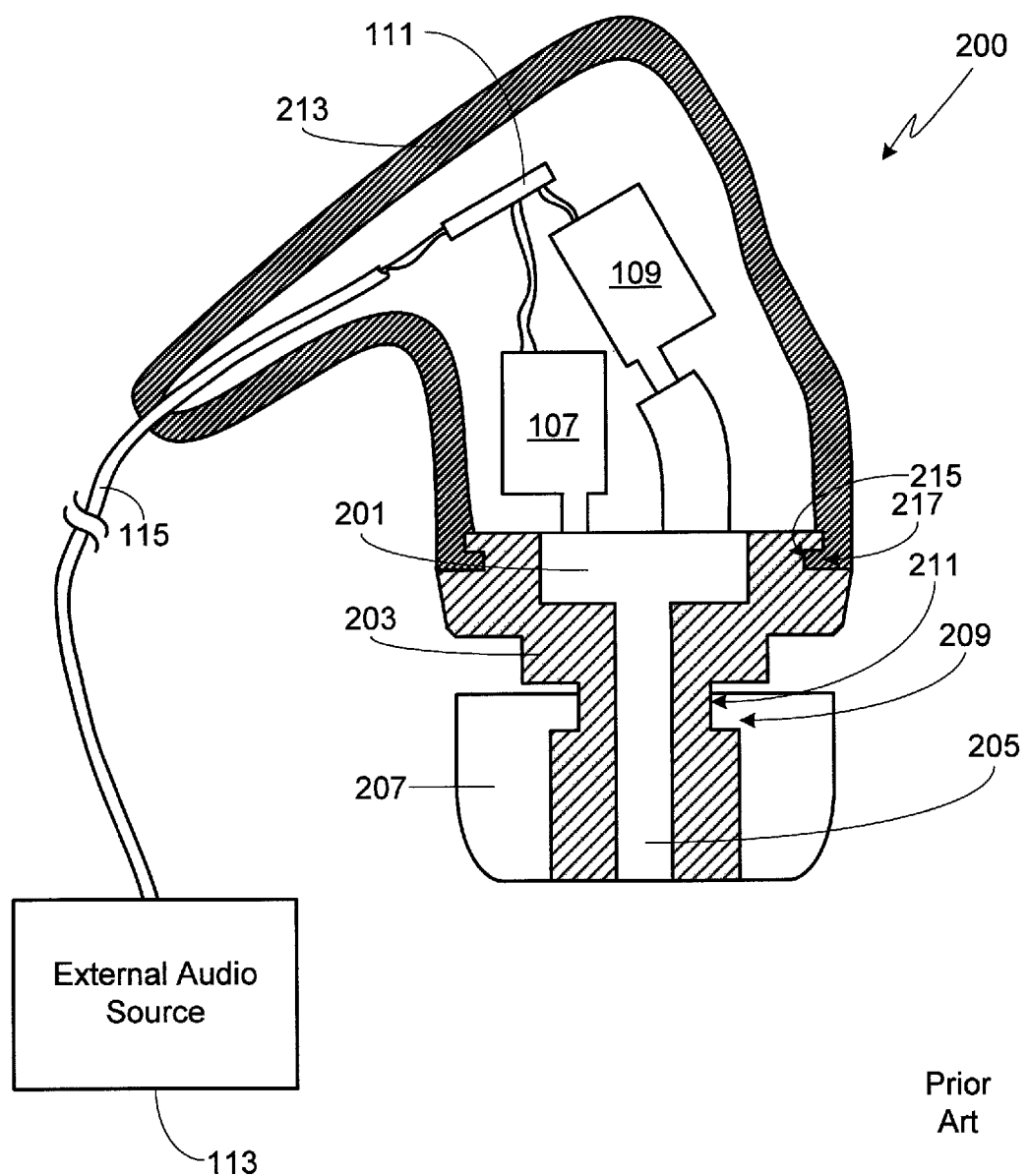
FIG. 2 illustrates the primary elements of a generic in-ear monitor according to the prior art.

While custom fit earpieces are typically more comfortable and provide better sound fidelity than generic earpieces, the latter configuration is traditionally much less expensive to manufacture given the straight-forward fabrication process. FIG. 2 illustrates the primary elements of a generic IEM 200 in accordance with the prior art. As in the prior example, monitor 200 includes a pair of drivers 107/109, a crossover circuit 111, and a cable 115 that couples IEM 200 to external audio source 113. The output from each driver enters an acoustic mixing chamber 201 within sound delivery member 203. A single sound delivery tube 205 delivers the mixed audio from the two drivers through the sound delivery member 203 to the user. Sound delivery member 203 is designed to fit within the outer ear canal of the user and as such, is generally cylindrical in shape.

Attached to the end portion of sound delivery member 203 is an eartip 207, also referred to as an eartip sleeve or simply a sleeve. Sleeve 207 can be fabricated from any of a variety of materials including foam, plastic and silicon-based material. Sleeve 207 can have the generally cylindrical and smooth shape shown in FIG. 2, or can include one or more flanges. To hold sleeve 207 onto member 203 during normal use but still allow the sleeve to be replaced when desired, typically the eartip includes a lip portion 209 which is fit into a corresponding channel or groove 211 in sound delivery member 203. The combination of an interlocking groove 211 with a lip 209 provides a convenient means of replacing sleeve 207, allowing sleeves of various sizes, colors, materials, material characteristics (density, compressibility), or shape to be easily attached to in-ear monitor 200. As a result, it is easy to provide the end user with a comfortable fit at a fraction of the cost of a custom fit earpiece. Additionally, the use of interlocking members 209 and 211 allow worn out eartips to be quickly and easily replaced. It will be appreciated that other eartip mounting methods can be used with earpiece 200. For example, sleeve 207 can be attached to sound delivery member 203 using pressure fittings, bonding, etc.

An outer earpiece enclosure 213 attaches to sound delivery member 203. Earpiece enclosure 213 protects drivers 107/109 and any required earpiece circuitry (e.g., crossover circuit 111) from damage while providing a convenient means of securing cable 115 to the in-ear monitor. Enclosure 213 can be attached to member 203 using interlocking members (e.g., groove 215, lip 217). Alternately, an adhesive or other means can be used to attach enclosure 213 to member 203. Enclosure 213 can be fabricated from any of a variety of materials, thus allowing the designer and/or user to select the material's firmness (i.e., hard to soft), texture, color, etc. Enclosure 213 can either be custom molded or designed with a generic shape.

Figure 3:
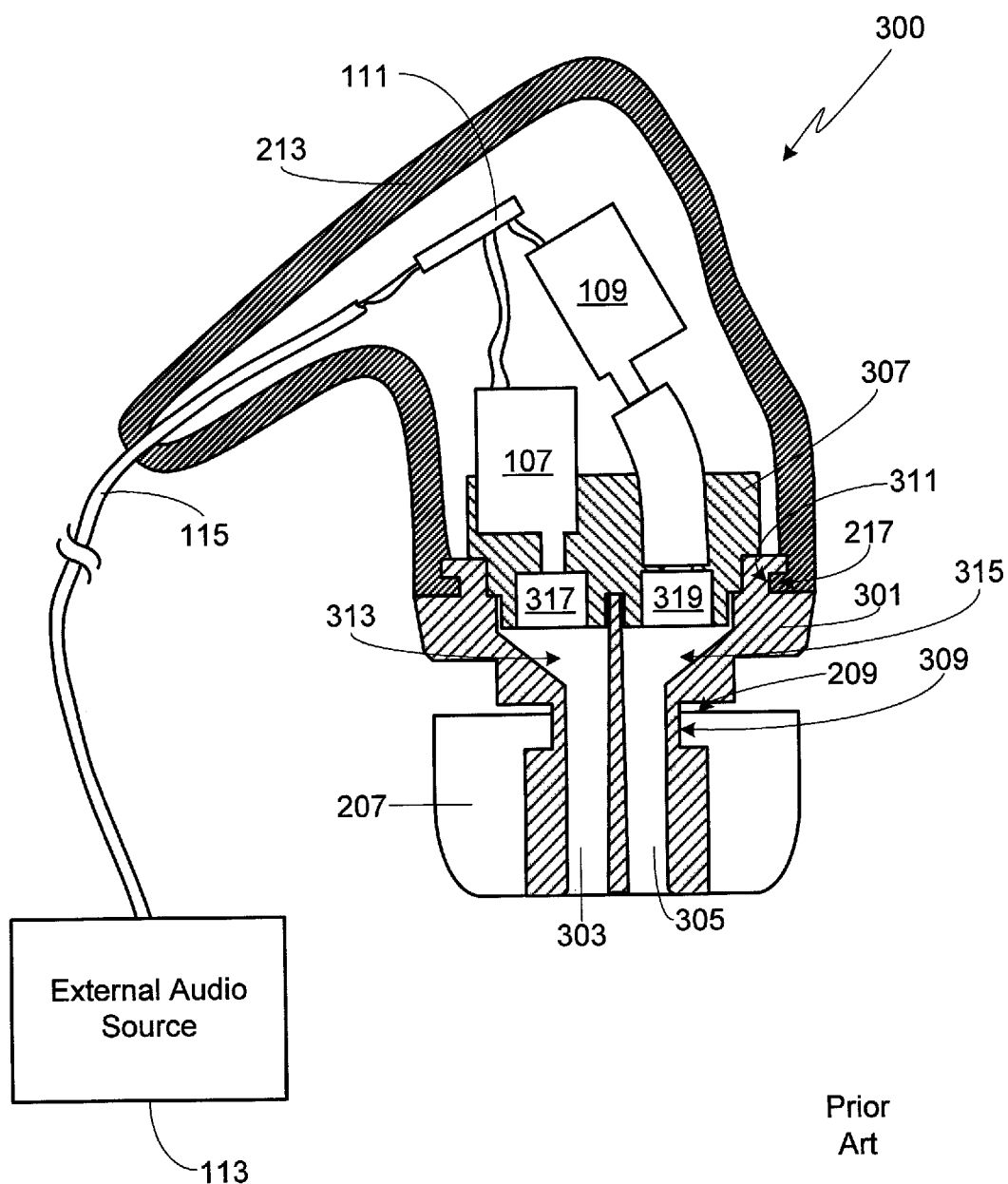
FIG. 3 illustrates the primary elements of a dual bore in-ear monitor according to the prior art.

FIG. 3 illustrates the primary elements of a dual bore in-ear monitor 300 in accordance with the prior art. As shown, in addition to the previously described components, sound delivery member 301 of earpiece 300 includes two separate sound delivery bores 303/305, corresponding to drivers 107 and 109, respectively. Preferably sound delivery member 301 is molded, thus permitting sound delivery bores 303/305 to be easily fabricated within the member. Also preferably a boot member 307 attaches to sound delivery member 301, boot member 307 securing the components to the sound delivery member while still providing a means of including acoustic filters as described more fully below. As with the in-ear monitor illustrated in FIG. 2, monitor 300 includes a removable sleeve 207 (e.g., foam sleeve, silicon sleeve, flanged sleeve, etc.) which is attached by interlocking sleeve lip 209 onto groove 309 of member 301. Similarly, monitor 300 includes a housing enclosure 213 coupled to member 301 using interlocking members (e.g., groove 311, lip 217)

In the in-ear monitor illustrated in FIG. 3, sound delivery tubes 303/305 include transition regions 313/315, respectively. Regions 313/315 redirect the sound emitted by the drivers to the two delivery tubes 303/305, thus insuring that the tubes pass through the small ID of member 301, in particular the necked down region of member 301 corresponding to groove 309. Also shown is an acoustic damper 317 interposed between driver 107 and sound tube 303, and a second acoustic damper 319 interposed between driver 109 and sound tube 305. The use of dampers allows the output from the in-ear monitor 300 in general, and the output from either driver in particular, to be tailored. Tailoring may be used, for example, to reduce the sound pressure level overall or to reduce the levels for a particular frequency range or from a particular driver.

As previously noted, custom fit earpieces typically provide improved performance in terms of delivered sound fidelity and user comfort, while generic earpieces provide a simple, easy to manufacture design that reduces manufacturing time and cost. In accordance with the present invention, and as illustrated in FIGS. 4-6, a single piece driver module 400 is used to achieve the fabrication benefits of a generic earpiece along with the fit and performance benefits associated with a custom fit earpiece.

Figure 4:
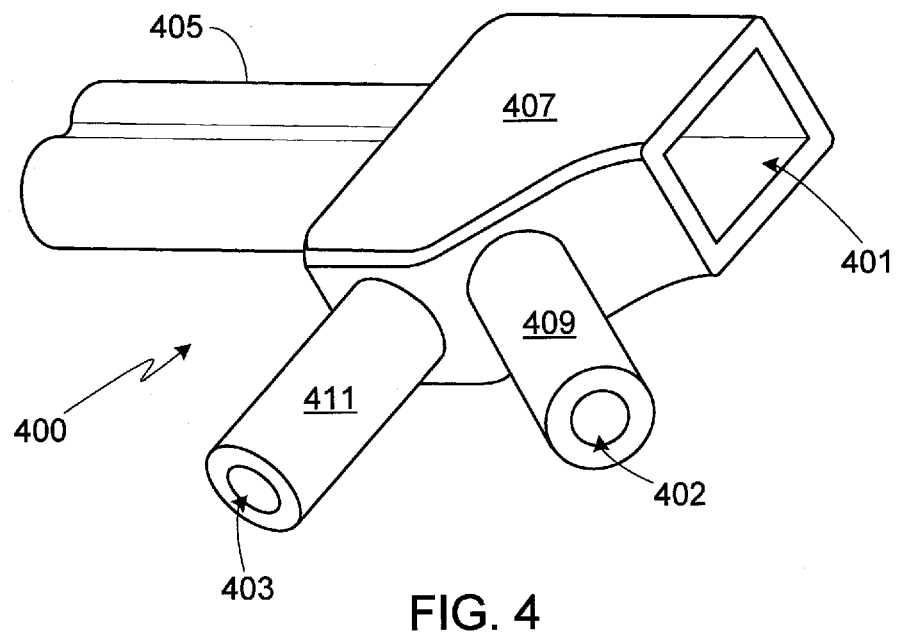
FIG. 4 provides a perspective view of a driver module in accordance with the invention.
Figure 5:
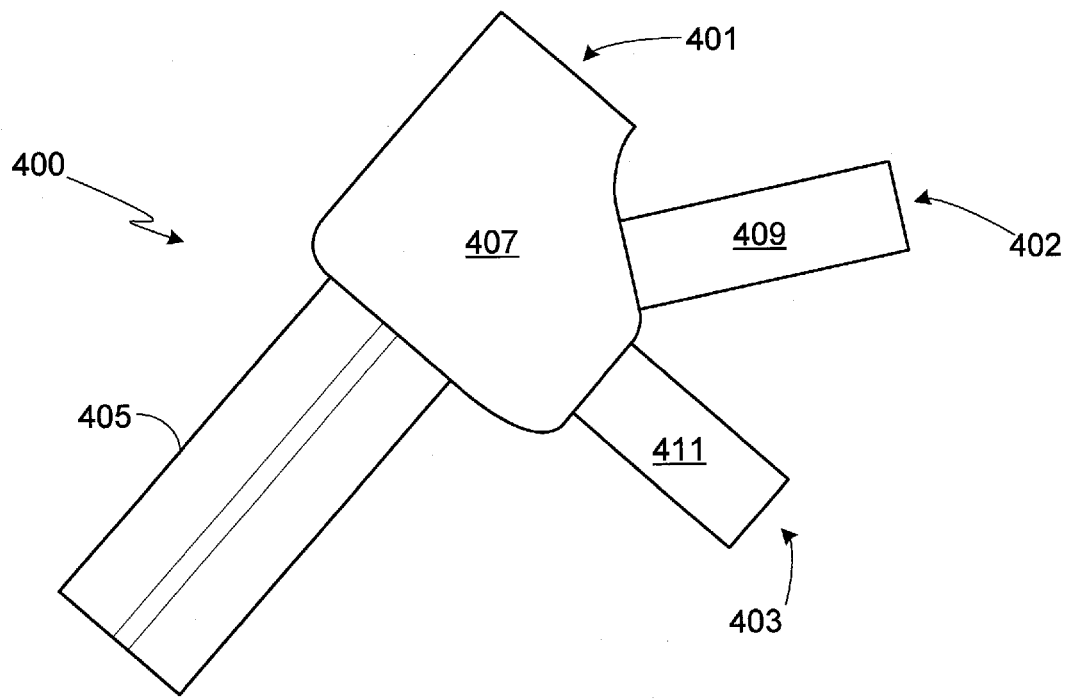
FIG. 5 provides a top view of the driver module shown in FIG. 4.
Figure 6:
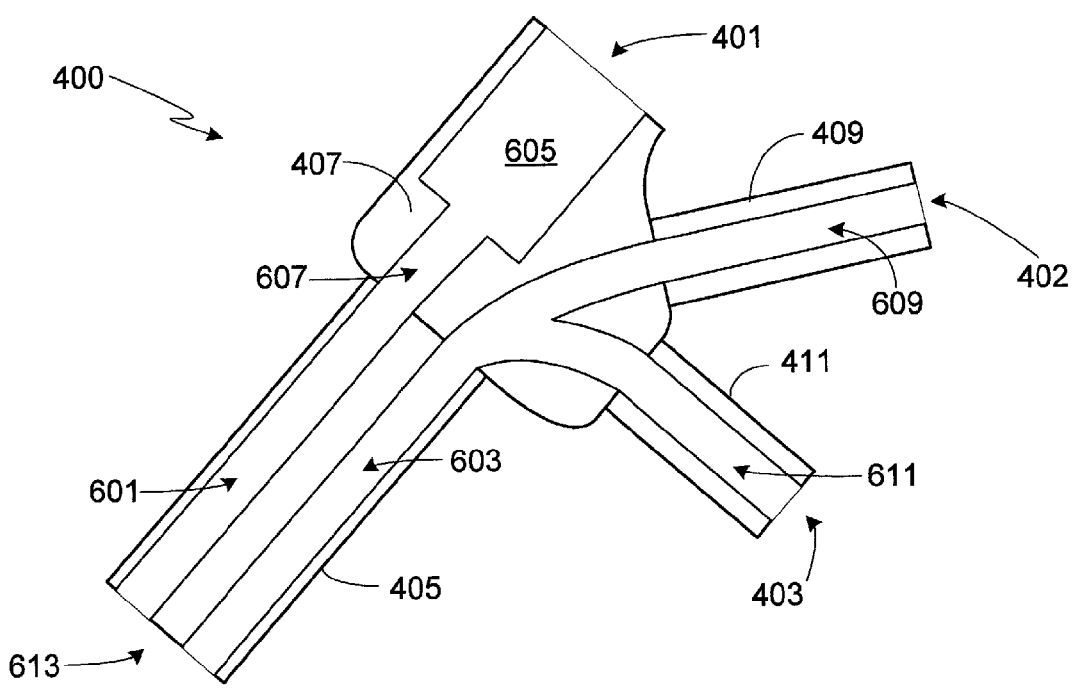
FIG. 6 provides a cross-sectional top view of the driver module shown in FIGS. 4 and 5.

FIG. 4 provides a perspective view of driver module 400, FIG. 5 provides a top view of module 400, and FIG. 6 provides a cross-sectional top view of module 400. Driver module 400 includes a plurality of driver ports. In the preferred embodiment module 400 includes three driver ports 401-403, although it will be appreciated that the driver module may include additional driver ports or as few as two driver ports. As described in further detail below, the driver ports are acoustically coupled to one or more sound bores contained within the driver module's acoustic output member 405. Member 405 extends away from one side of the body 407 of driver module 400. Preferably sound output member 405 includes a pair of sound bores 601 and 603 as shown, although the driver module may be configured to use a single sound bore or more than two sound bores.

In the illustrated and preferred embodiment, driver port 401 is formed as a cavity 605 within body 407 of driver module 400, cavity 601 shaped to accommodate a single driver (not shown in FIG. 6). Cavity 605 opens to an acoustic transition duct 607 that acoustically couples the output of an armature housed within cavity 605 to sound bore 601 in acoustic output member 405. The remaining two driver ports 402 and 403 are formed as extended members 409 and 411, respectively, of body 407 of module 400. Preferably driver port members 409 and 411 are formed as cylinders. Sound bore 609 of member 409 passes through body 407 after which it transitions into sound bore 603 of output member 405. Sound bore 611 of member 411 merges with sound bore 609 within module body 407 before transitioning into sound bore 603 of output member 405.

Driver module 400 is pre-tuned, thus allowing it to be easily incorporated into a custom-fit ear mold without the need for post-assembly tuning as required by the prior art manufacturing process. In general, pre-tuning of the driver module is accomplished by pre-selecting the lengths, as well as bore diameters, for extended driver port members 409/411, transition duct 607, and acoustic output member 405. In some embodiments, additional IEM tuning is achieved by adjusting the output of individual gain amplifiers associated with the drivers. Additionally, acoustic filters (i.e., dampers) may be inserted within driver module 400, for example between one or more of the drivers and their respective driver ports.

Figure 7:
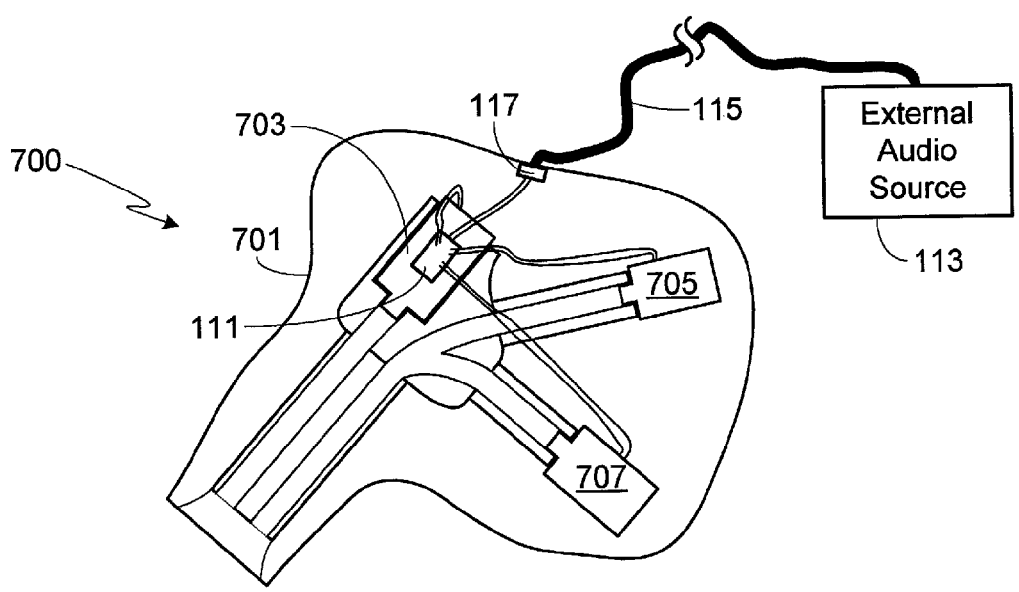
FIG. 7 illustrates the driver module of the invention integrated into a custom-fit ear mold, this view providing an internal top view of the IEM in order to clearly show the relative positions of the drivers relative to the driver ports.

FIG. 7 illustrates driver module 400 integrated into a custom-fit ear mold 701, this view providing an internal top view of IEM 700 in order to clearly show the relative positions of the drivers relative to the driver ports 401-403. Preferably driver 703, which is housed within cavity 605, is a high-frequency driver, thereby taking advantage of the short and relatively straight acoustic pathway between the driver output and the output face 613 of acoustic output member 405. Preferably drivers 705 and 707 are mid- and low-frequency drivers, respectively. Crossover circuit 111, either a passive crossover circuit or an active crossover circuit, is coupled to external audio source 113 and provides input to drivers 703, 705 and 707. As in the prior art IEMs, cable 115 may either be hard-wired to IEM 700 or electrically connected to IEM 700 via a cable socket 117 integrated into the IEM as shown.

Figure 8:
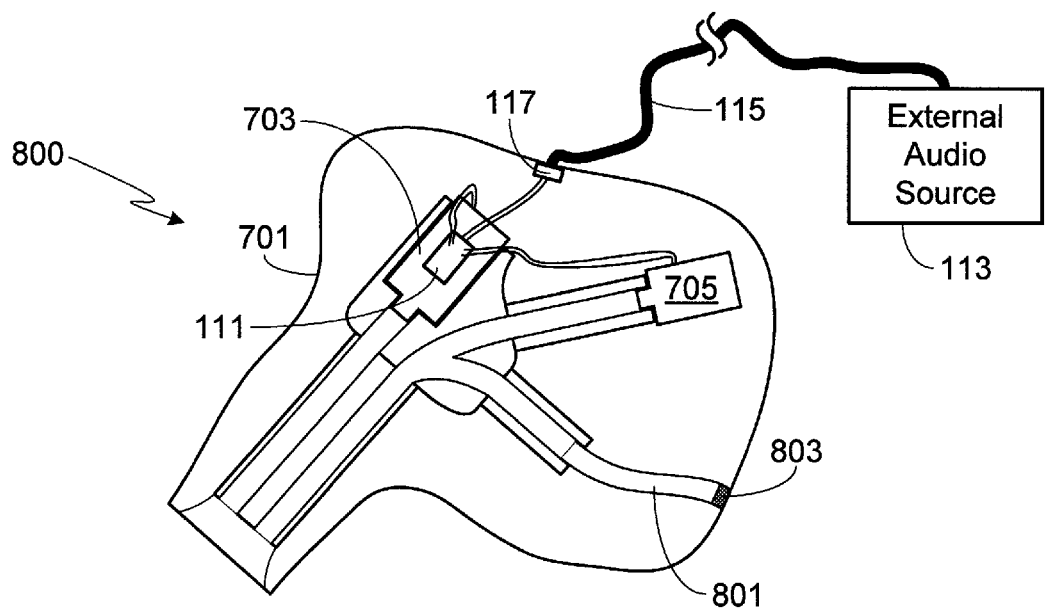
FIG. 8 provides a similar view of an IEM to that shown in FIG. 7, except that one of the drivers has been replaced by an ambient sound bore.

In addition to simplifying IEM fabrication, the single piece driver module of the present invention also provides a single component that can be used in a variety of IEM configurations by simply varying the number and type of drivers coupled to the driver ports. For example, in the configuration illustrated in FIG. 8, rather than coupling a driver to driver port 411, this port is coupled via sound bore 801 to the ambient environment. As a result, ambient noises pass through bores 801, 611 and 603 and then directly into the user's ear canal via acoustic output member 405. Although not required, in this embodiment a damper 803 is inserted into the bore to attenuate ambient sound levels to the desired level. Note that FIG. 8 provides a similar view of an IEM to that shown in FIG. 7, except that driver 707 has been replaced by ambient sound bore 801.

In the configuration described above in which single piece driver module 400 is separate from the custom-fit ear mold, preferably one or more of the various members that extend away from body 407, e.g., output member 405 and driver port members 409 and 411, are fabricated from a pliable material so that they may be moved out of plane as required by the specific geometry of each particular user's ear mold. The body 407 of the module may be fabricated from the same pliable material or from a rigid material such as a plastic. Preferably the pliable portions of module 400 are fabricated from silicone, although other elastomeric materials that allow out-of-plane positioning of members 405, 409 and 411 may be used (e.g., neoprene, ethylene propylene diene monomer (EPDM), nitrile rubber, nitrile, polyvinyl chloride (PVC), nitrile/PVC blends, urethane, etc.).

Figure 9:
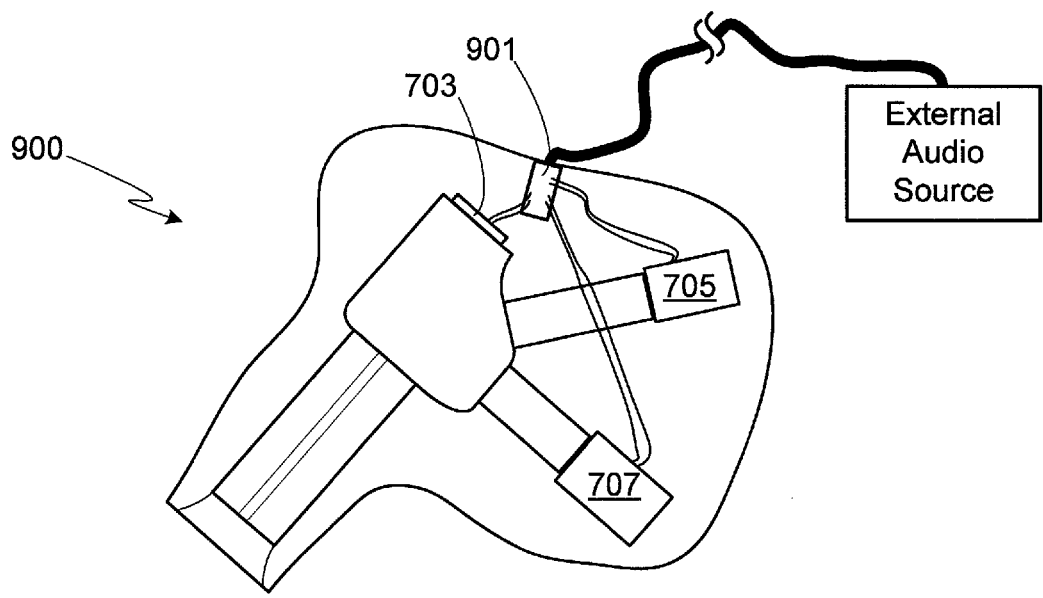
FIG. 9 illustrates an embodiment in which the cable socket and the crossover circuit are integrated into a single component.
Figure 10:
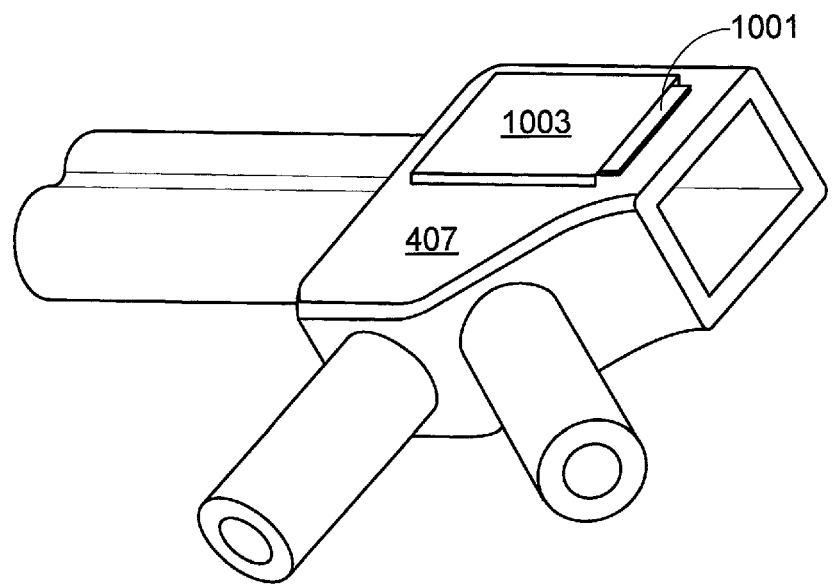
FIG. 10 illustrates the use of a slotted cavity formed on one surface of the driver module that is used to hold the crossover circuit board in place during assembly.
Figure 11:
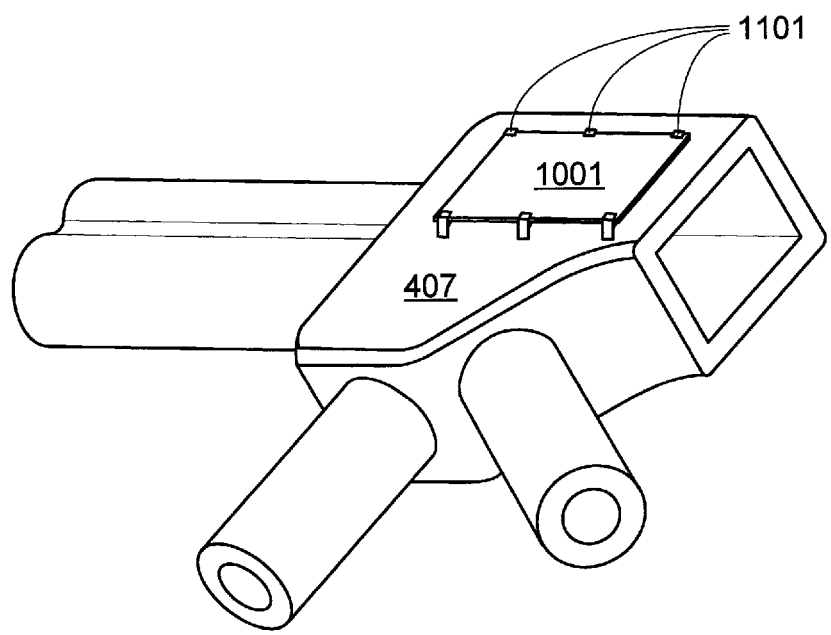
FIG. 11 illustrates a plurality of mounting clips which hold the crossover circuit board in place during assembly.
Figure 12:
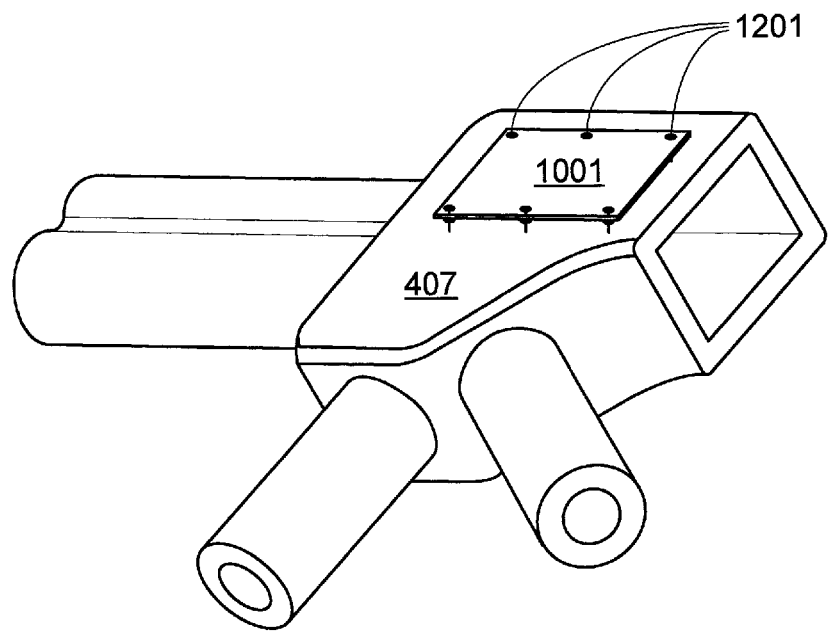
FIG. 12 illustrates a plurality of barbed stand-offs which hold the crossover circuit board in place during assembly.

The IEM's crossover circuit, which provides a means of dividing the input electrical signal among the plurality of IEM drivers (e.g., drivers 703, 705 and 707), may be integrated into the IEM in a variety of ways without affecting the invention. For example, in IEM 900 shown in FIG. 9, the cable socket and the crossover circuit are combined into a single component 901, thereby further simplifying IEM fabrication. Alternately, the crossover circuit may be fabricated on a separate printed circuit board (PCB) 1001 that is installed within the IEM during assembly. Although not required, in such a configuration preferably driver module 400 includes mounting means for circuit board 1001, thus simplifying IEM fabrication. It should be understood that there are a variety of techniques that may be used to capture circuit board 1001 and that the invention is not limited to a specific mounting means, nor does the invention even require the use of mounting means. FIGS. 10-12 illustrate exemplary circuit mounting means. In the embodiment shown in FIG. 10, a slotted cavity 1003 is formed on one surface of body 407 of the driver module. During IEM fabrication circuit 1001 is slipped into the cavity as shown. In the embodiment shown in FIG. 11, a plurality of mounting clips 1101 hold circuit board 1001 in place. In the embodiment shown in FIG. 12, a plurality of barbed stand-offs 1201 are inserted through corresponding mounting holes within circuit board 1001. In an alternate embodiment, circuit board 1001 is simply bonded to a surface of driver module 400.

Figure 13:
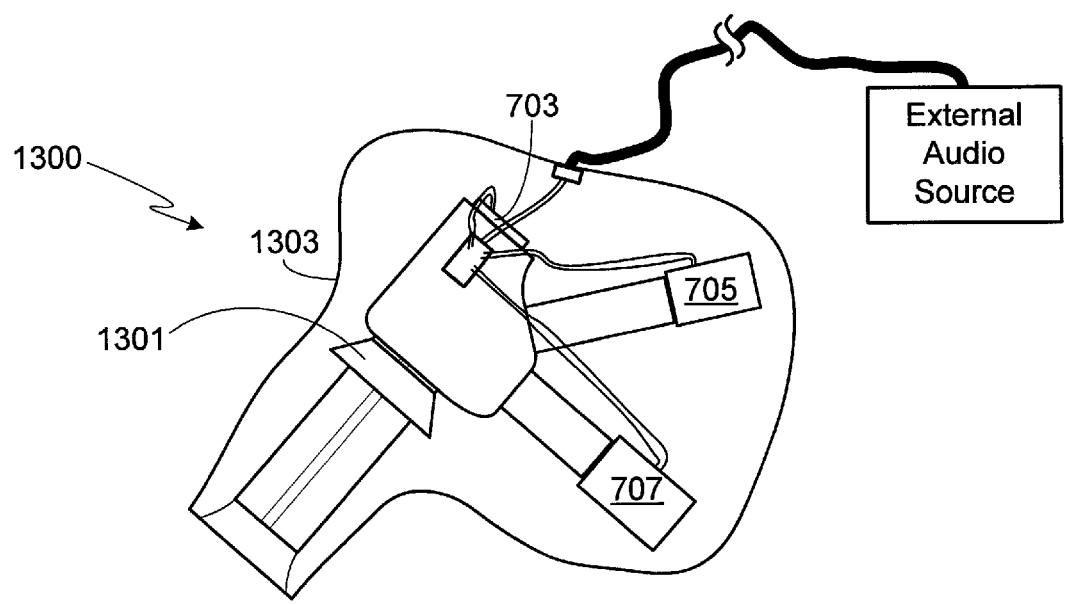
FIG. 13 illustrates the use of a locking feature, in particular a locking barb located on the acoustic output member, that insures that the driver module is properly positioned and held in place within the IEM custom-fit ear mold.
Figure 14:
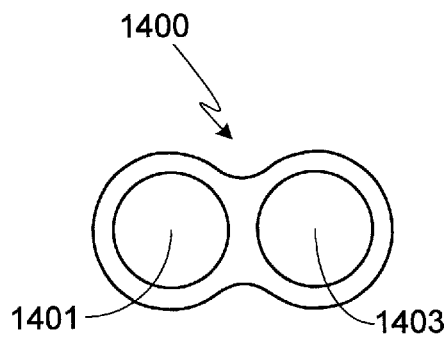
FIG. 14 provides a cross-sectional view of an acoustic output member in accordance with a first embodiment.
Figure 15:
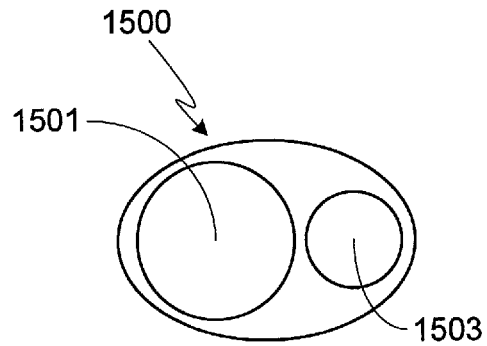
FIG. 15 provides a cross-sectional view of an acoustic output member in accordance with a second embodiment.
Figure 16:
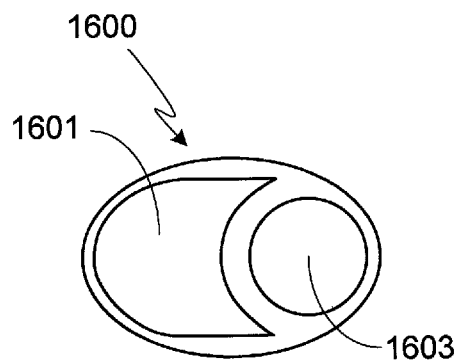
FIG. 16 provides a cross-sectional view of an acoustic output member in accordance with a third embodiment.
Figure 17:
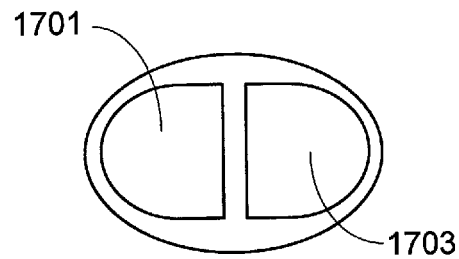
FIG. 17 provides a cross-sectional view of an acoustic output member in accordance with a fourth embodiment.
Figure 18:
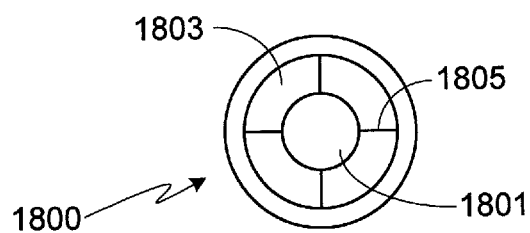
FIG. 18 provides a cross-sectional view of an acoustic output member in accordance with a fifth embodiment.

In some embodiments of the invention, driver module 400 includes one or more external features that aid in positioning and/or maintaining the module within the custom-fit ear mold. For example, IEM 1300 shown in FIG. 13 includes a locking barb 1301 located on acoustic output member 405 that insures that the driver module is properly positioned and held in place within IEM custom-fit ear mold 1303.

As previously noted, sound output member 405 preferably includes a pair of sound bores although it may be configured to use a single sound bore or more than two sound bores. Additionally, and as described below, the present invention is not limited to a specific cross-sectional shape for either the acoustic output member or the sound bores contained therein. FIGS. 14-18 illustrate exemplary cross-sections for an acoustic output member with dual sound bores. In the embodiment shown in FIG. 14, acoustic output member 1400 includes a pair of side-by-side sound bores 1401 and 1403, where the two sound bores have equivalent cross-sections. Acoustic output member 1500 shown in the embodiment of FIG. 15 also includes a pair of side-by-side sound bores, but in this embodiment the cross-section of sound bore 1501 is larger than the cross-section of sound bore 1503. Typically in this embodiment the high frequency driver (e.g., driver 703) is acoustically coupled to the larger sound bore (e.g., sound bore 1501) while the mid- and low-frequency drivers (e.g., drivers 705 and 707) are acoustically coupled to the smaller sound bore (e.g., sound bore 1503). In the embodiment illustrated in FIG. 16, sound bore 1601 has a non-circular cross-section while the second, smaller sound bore 1603 has a circular cross-section. In the embodiment illustrated in FIG. 17, both sound bore 1701 and sound bore 1703 utilize non-circular cross-sections. The embodiment of FIG. 18 uses a pair of concentric sound bores 1801 and 1803 with the inner bore 1801 being held in place and apart from the outer bore 1803 by a plurality of support struts 1805.

Figure 19:
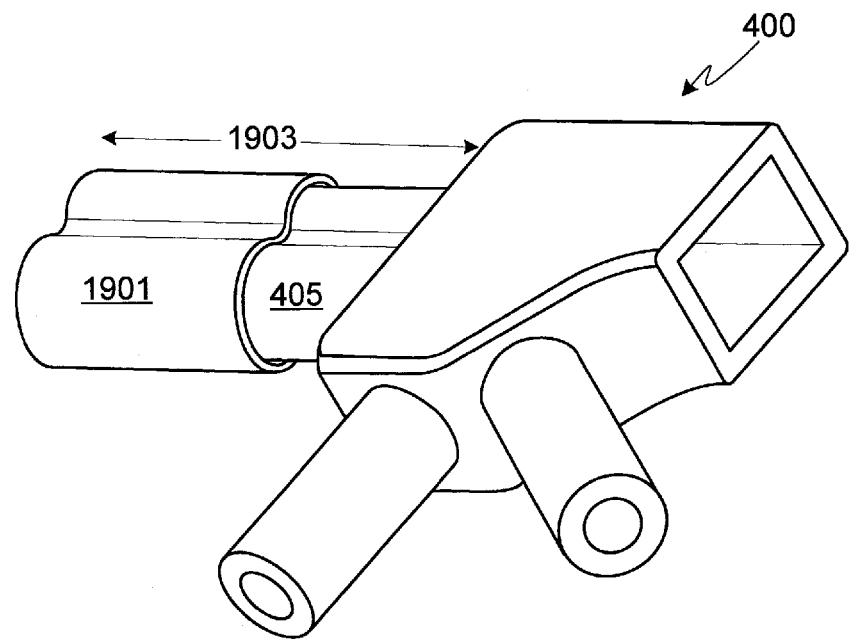
FIG. 19 illustrates the driver module of the invention with a sliding extension on the acoustic output member.
Figure 20:
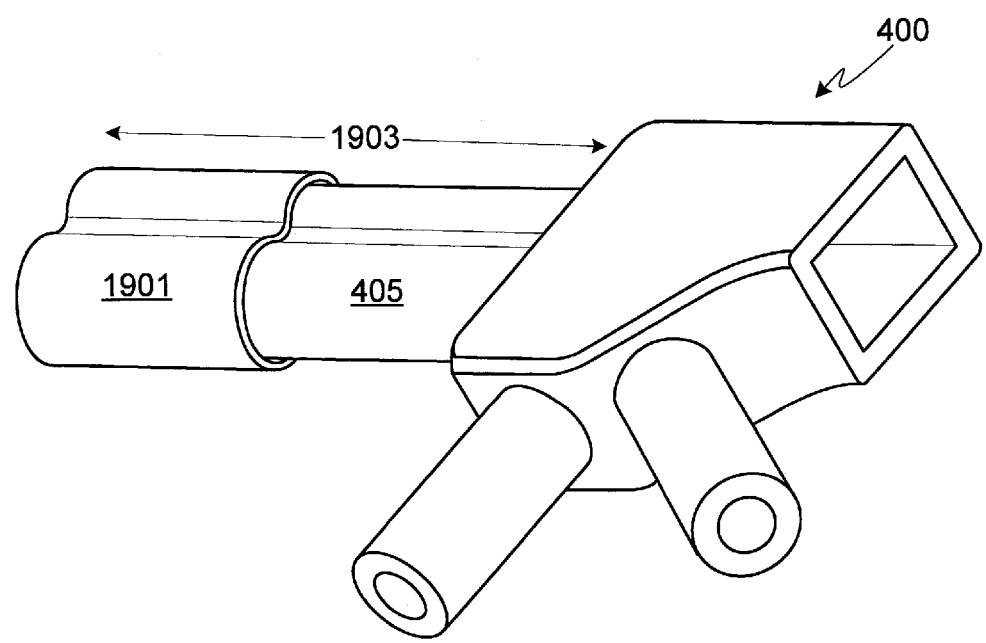
FIG. 20 illustrates the driver module shown in FIG. 19 with the acoustic output member sliding extension extended.

In at least one embodiment of the invention, driver module 400 includes an extension 1901 fitted onto the acoustic output member 405. FIG. 19 shows extension 1901 in a non-extended position while FIG. 20 shows extension 1901 in an extended position. Extension 1901 allows the length 1903 of the acoustic output member to be varied depending upon the desired acoustic performance as well as the size and shape of the custom-fit ear mold into which the driver module is to be fit.

One of the benefits of the present invention is that it allows a pre-tuned driver assembly which utilizes the acoustically optimized driver module described above to be inserted into a custom-fit IEM shell, thereby greatly simplifying custom-fit IEM fabrication and assembly. While the driver assembly and the crossover circuit may be sealed within the IEM shell using a filler, an alternative approach is to use a faceplate to seal the IEM shell after the components have been inserted. In this approach, the IEM components may be held in place by an adhesive, padding, filler or an interference fit with the internal features of the IEM shell. By using the same size cutout for each custom IEM shell, the same faceplate can be used, thereby further reducing IEM fabrication complexity.

Figure 21:
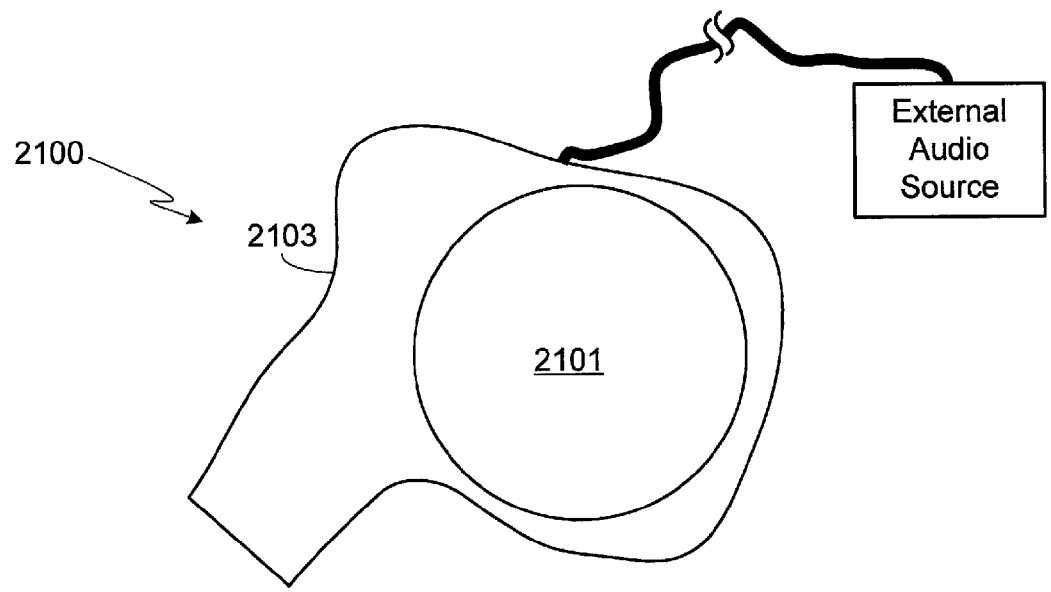
FIG. 21 provides a top view of an IEM with a faceplate in accordance with the invention.
Figure 22:
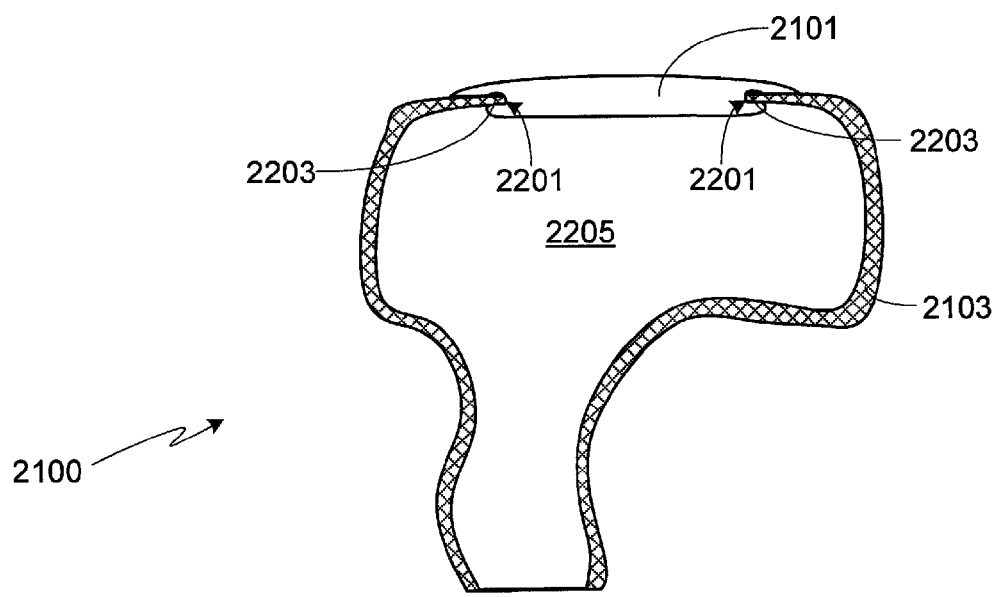
FIG. 22 provides a cross-sectional view of the IEM and faceplate assembly shown in FIG. 21.

FIGS. 21 and 22 illustrate a preferred design for an IEM faceplate in accordance with the invention. Faceplate 2101, which can be fabricated from plastic or any sufficiently rigid material, fits within a suitably sized opening within IEM shell 2103 of IEM 2100. Although the opening within the IEM shell may have a distinct shape, preferably it is circularly-shaped, thus allowing the faceplate to be easily installed. Rather than being bonded to the IEM shell, preferably faceplate 2101 is designed to snap-fit within the IEM opening, thus allowing subsequent faceplate removal if the IEM must be repaired or otherwise altered. In order to achieve the preferred snap-fit, the lip 2201 of the IEM shell opening fits within a corresponding groove within faceplate 2101 as shown in the cross-sectional view of FIG. 22. Preferably an O-ring 2203 seals faceplate 2101 into IEM shell 2103. For clarity, the IEM components, e.g., driver module, drivers, crossover circuit, etc., are not shown in the open center section 2205 of the cross-sectional view of FIG. 22.

Figure 23:
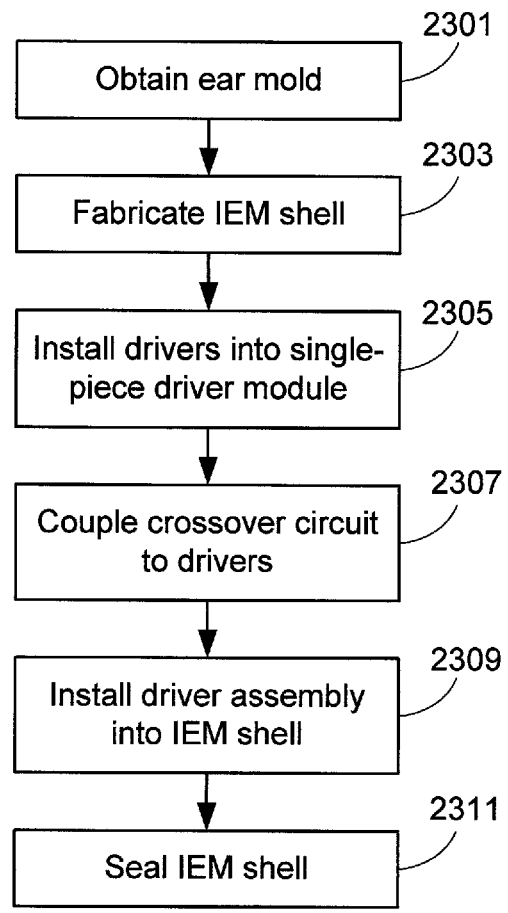
FIG. 23 illustrates a fabrication and assembly process suitable for use with the driver module of the invention.

As noted above, the use of a pre-tuned, single piece driver module simplifies the fabrication of a custom-fit IEM, thereby reducing cost, while insuring that the performance consistently meets the acoustic goals for the device. FIG. 23 illustrates the primary manufacturing steps associated with the fabrication of a custom-fit IEM utilizing the single piece driver module of the invention. Initially in step 2301 a mold is taken of the end user's ear or, more typically, of both of the end user's ears in order to allow a pair of custom-fit IEMs to be fabricated. Using the mold(s), the custom-fit IEM shell(s) is fabricated (step 2303). Then, after installing the drivers into the driver module (step 2305) and coupling the crossover circuit to the drivers (step 2307), the single piece driver module, drivers, and crossover circuit are inserted into the custom-fit IEM shell(s) (step 2309). Lastly, the IEM shell is sealed (step 2311) in order to protect the internal components. The step of sealing the IEM shell may use a filler (e.g., an epoxy or polyester resin) that is added to the cavity within the IEM shell(s), the filler capturing and protecting the driver module, drivers, crossover circuit and wiring within the shell(s). Step 2311 may also utilize the IEM cover described above and shown in FIGS. 21 and 22. It will be appreciated that due to the use of the pre-tuned driver module, the IEM(s) does not have to be tuned prior to finalization.

Figure 24:
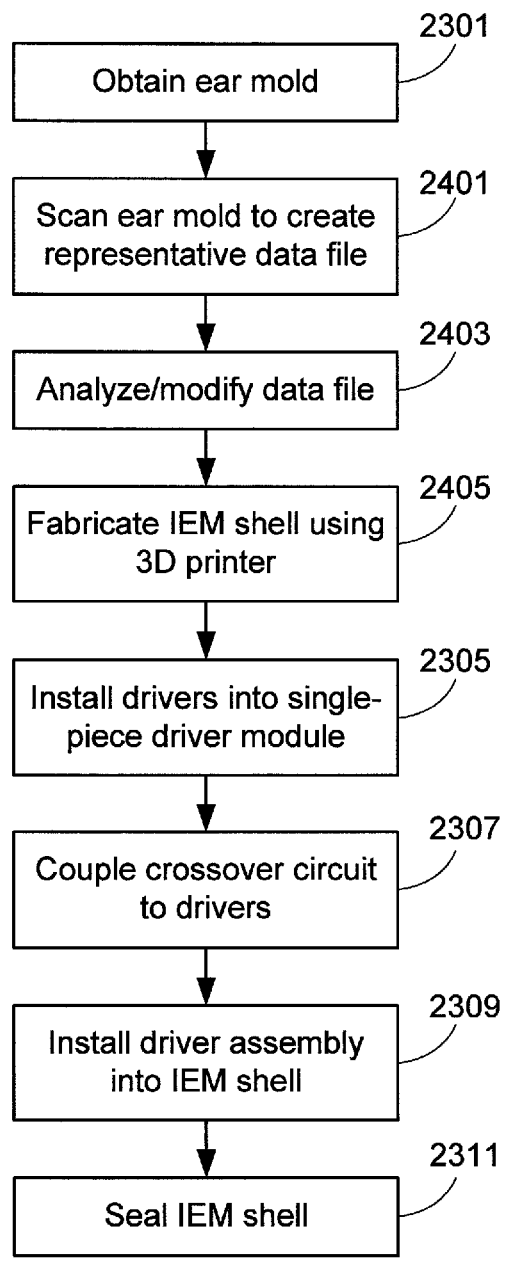
FIG. 24 illustrates an alternate fabrication and assembly process suitable for use with the driver module of the invention.

By eliminating the necessity of tuning each IEM prior to finalization, the present invention allows the manufacturing process to be substantially altered from the traditional, more labor intensive process typically used to manufacture custom-fit IEMs. For example, FIG. 24 illustrates a modified assembly process based on the procedure outlined in FIG. 23. In the modified process after the end user's ear mold is taken (step 2301), the ear mold is scanned (step 2401), for example using a three-dimensional (3D) scanner, in order to create a data file that represents the shape of the desired ear mold (step 2401). The data file is then analyzed and modified to create a final data file that represents the desired external shape as well as the desired internal features that will allow the ear mold to accommodate the single piece driver module 400 and driver assembly. (Step 2403). Using the final data file, a 3D printer is then used to fabricate the IEM shell (step 2405). Once the IEM shell is fabricated and the drivers and crossover circuit have been installed onto the driver module (steps 2305 and 2307), the single piece driver module, drivers, and crossover circuit are inserted into the IEM shell (step 2309) and the IEM shell is sealed in order to protect the IEM internal assembly (step 2311).

Figure 25:
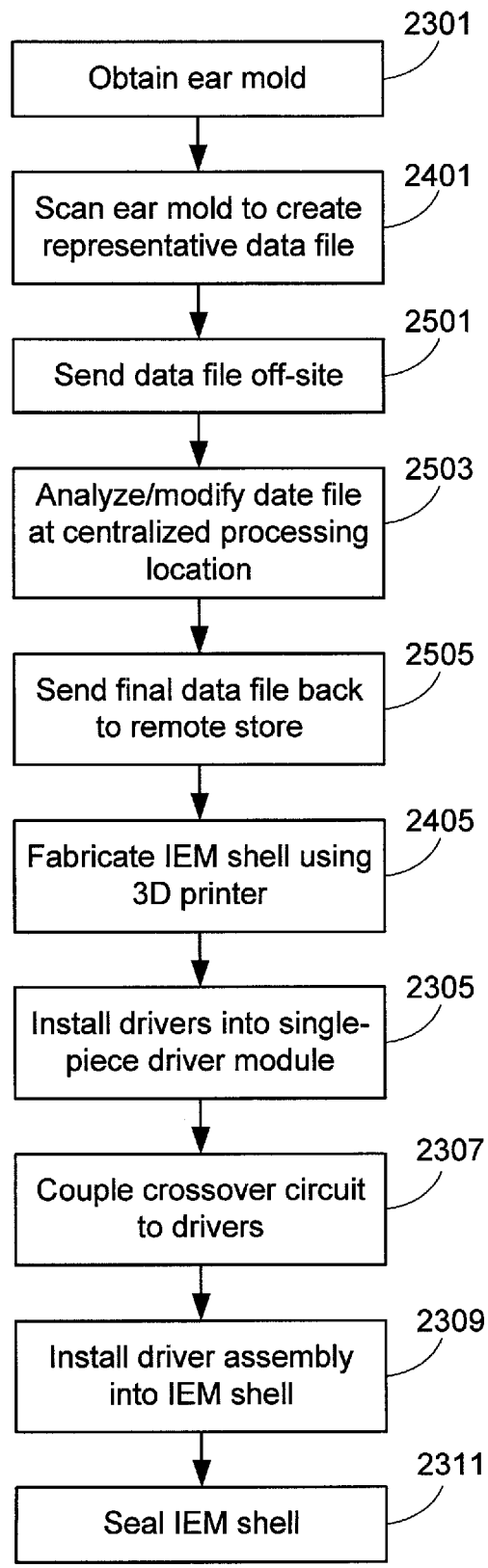
FIG. 25 illustrates an alternate fabrication and assembly process suitable for use with the driver module of the invention.

As a result of simplifying the manufacturing and assembly process, the present invention allows portions of the process to be performed remotely and off-site. For example and as illustrated in FIG. 25, the ear mold may be made (step 2301) and scanned (step 2401) at a location convenient for the end user, for example a store within a shopping mall, a stand-alone store, or a region carved out of an existing store (e.g., a store-within-a-store). The data file created at the store can then be sent to another site, for example a central processing site in a different geographic region, for analysis (step 2501). At the central processing site the initial data file is analyzed and modified to include the desired internal features that will allow the ear mold to accommodate the single piece driver module 400 and driver assembly (step 2503). The final data file along with assembly instructions are then sent back to the remotely located store (step 2505) where the IEM shell is fabricated, for example using a 3D printer (step 2405). The driver assembly, i.e., single piece driver module, drivers and crossover circuit, is then assembled (steps 2305 and 2307) and inserted into the IEM shell (step 2309) after which the IEM shell is sealed (step 2311).

In the process described above, the use of a single piece, pre-tuned driver module not only simplifies IEM construction, but it also allows relatively un-trained personnel to assemble the final IEM. To further simplify the process entire driver assemblies, i.e., single piece driver module, drivers and crossover circuit, may be pre-assembled, thereby further minimizing the tasks that must be performed on-site (e.g., within the store).

Figure 26:
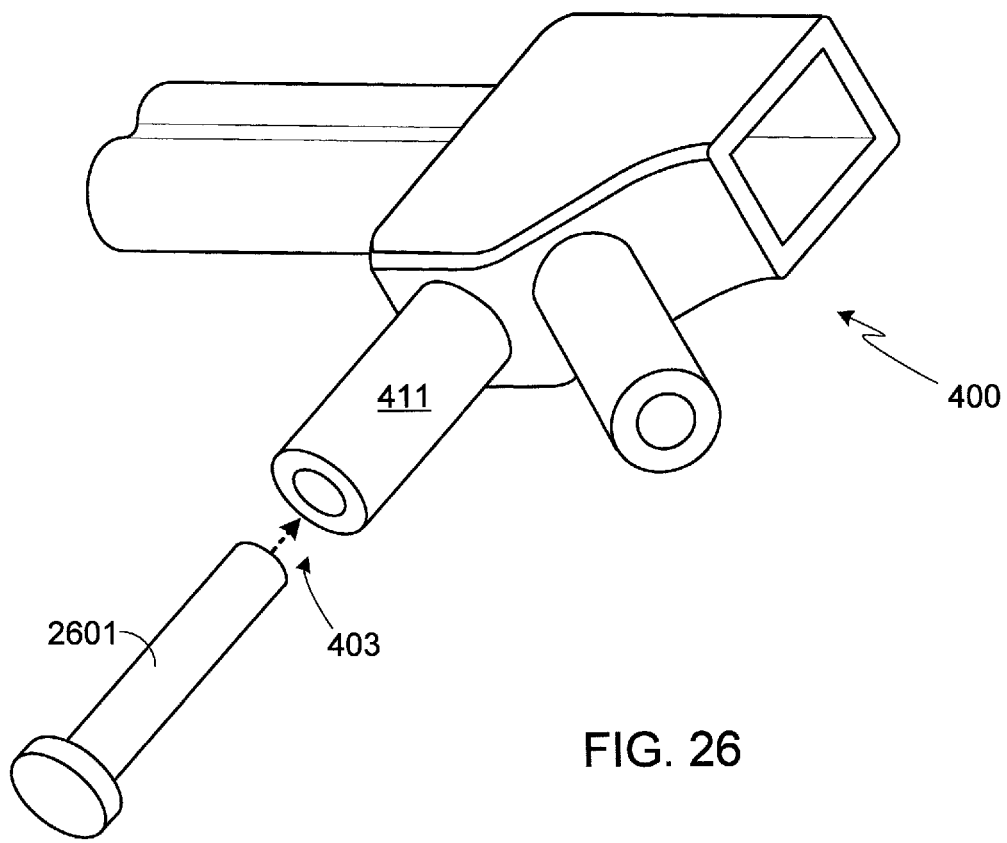
FIG. 26 illustrates a driver port plug prior to assembly.
Figure 27:
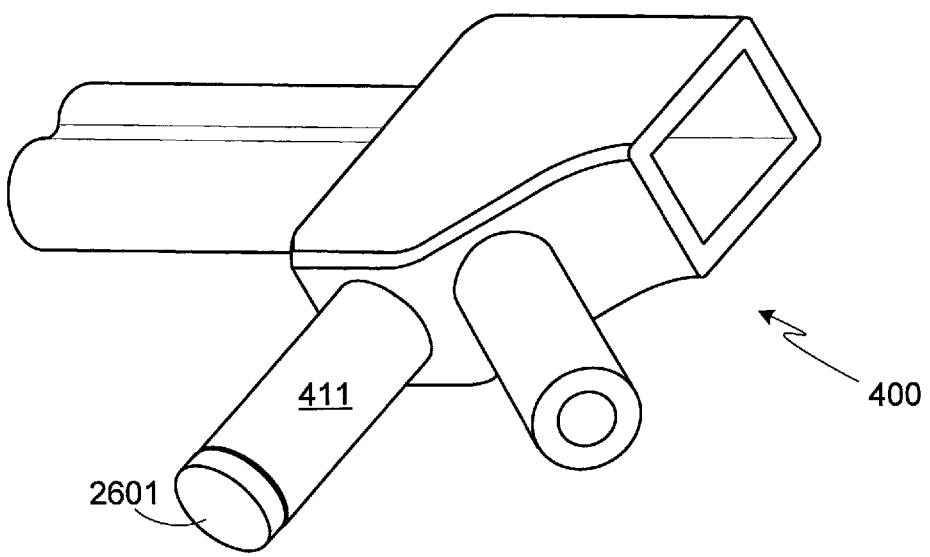
FIG. 27 illustrates the driver port plug shown in FIG. 26 post-assembly.
Figure 28:
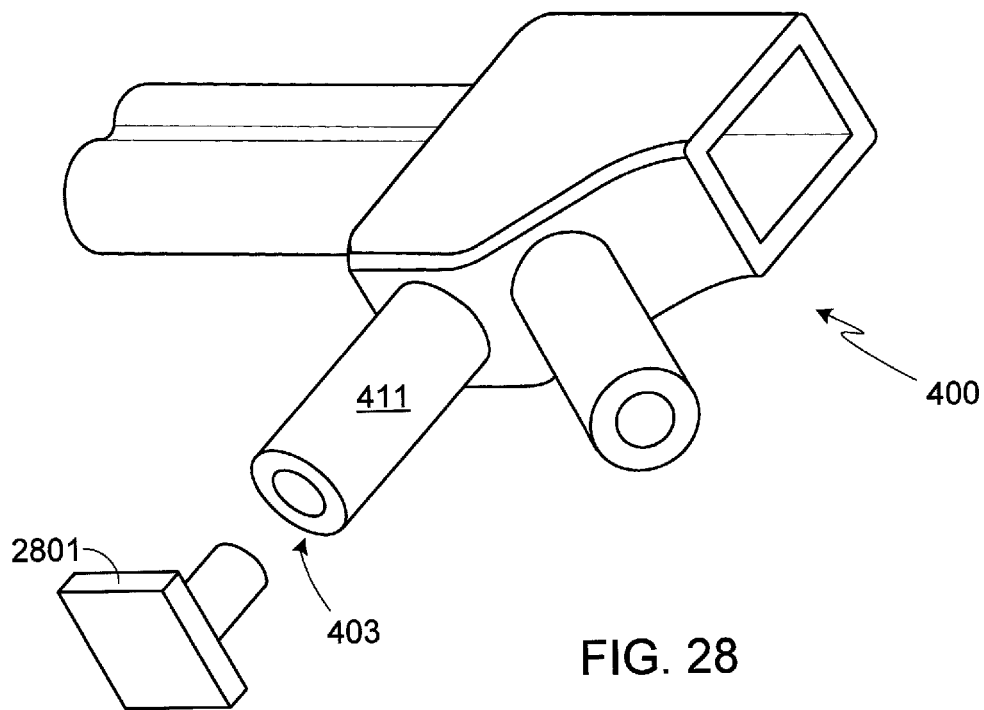
FIG. 28 illustrates an alternate driver port plug prior to assembly.
Figure 29:
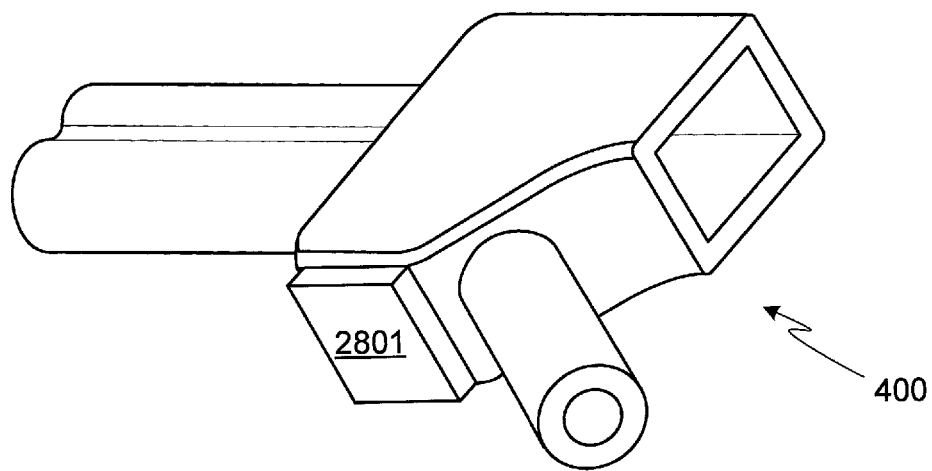
FIG. 29 illustrates the driver port plug shown in FIG. 28 post-assembly.

In order to further expand the usefulness of the single piece driver module of the invention, it is possible to block off one or more of the driver ports during assembly. As a result, the same single piece driver module can be modified to use a fewer number of drivers, thereby lowering IEM cost. FIGS. 26 and 27 illustrate the use of a simple plug 2601 which, in this example, is inserted into driver port 403. FIGS. 28 and 29 illustrate a different type of plug, also shown inserted into driver port 403, which requires that driver port member 411 be removed (e.g., cut-off) prior to insertion of plug 2801.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of fabricating a custom-fit in-ear-monitor (IEM), the method comprising the steps of:
    obtaining an ear mold for a specific end user;
    scanning said ear mold to generate an ear mold data file;
    fabricating a custom-fit ear mold shell based on said ear mold, wherein said step of fabricating said custom-fit ear mold shell further comprises the step of manufacturing said custom-fit ear mold shell with a 3D printer;
    installing a plurality of drivers into a plurality of driver ports of a single piece driver module to form a driver assembly;
    electrically connecting said plurality of drivers to a crossover circuit, wherein said crossover circuit is configured to receive an electrical signal from an audio source that is external to said custom-fit IEM and to provide separate input signals to each of said plurality of drivers based on said electrical signal;
    installing said driver assembly and said crossover circuit into said custom-fit ear mold shell, wherein said step of installing said driver assembly further comprises the step of acoustically coupling at least one sound bore corresponding to an acoustic output member of said single piece driver module to an acoustic output surface of said custom-fit ear mold shell, wherein said at least one sound bore is acoustically coupled via a plurality of sound ducts within a body portion of said single piece driver module to said plurality of driver ports; and
    sealing said driver assembly into said custom-fit ear mold shell.

2. The method of claim 1, further comprising the steps of analyzing said ear mold data file, modifying said ear mold data file to include a plurality of internal features compatible with said driver assembly, and generating a final data file based on said step of modifying said ear mold data file to include said plurality of internal features, wherein said step of manufacturing said custom-fit ear mold shell with said 3D printer is based on said final data file.

3. The method of claim 2, wherein said steps of obtaining said ear mold, scanning said ear mold to generate said ear mold data file, and manufacturing said custom-fit ear mold shell with said 3D printer are performed at a first geographic location, and wherein said steps of analyzing said ear mold data file, modifying said ear mold data file to include said plurality of internal features compatible with said driver assembly, and generating said final data file are performed at a second geographic location, wherein said first geographic location is geographically remote from said second geographic location.

4. The method of claim 3, wherein said first geographic location corresponds to a store and said second geographic location corresponds to a central processing site.

5. A method of fabricating a custom-fit in-ear-monitor (IEM), the method comprising the steps of:
   obtaining an ear mold for a specific end user;
   fabricating a custom-fit ear mold shell based on said ear mold;
   fabricating a single piece driver module, wherein said step of fabricating said single piece driver module further comprises the step of fabricating at least a portion of said single piece driver module from an elastomeric material, wherein said step of fabricating at least a portion of said single piece driver module from said elastomeric material further comprises the step of selecting said elastomeric material from the group of elastomeric materials consisting of silicone, neoprene, ethylene propylene diene monomer, nitrile rubber, nitrile, polyvinyl chloride, nitrile/PVC blends, and urethane;
   installing a plurality of drivers into a plurality of driver ports of said single piece driver module to form a driver assembly;
   electrically connecting said plurality of drivers to a crossover circuit, wherein said crossover circuit is configured to receive an electrical signal from an audio source that is external to said custom-fit IEM and to provide separate input signals to each of said plurality of drivers based on said electrical signal;
   installing said driver assembly and said crossover circuit into said custom-fit ear mold shell, wherein said step of installing said driver assembly further comprises the step of acoustically coupling at least one sound bore corresponding to an acoustic output member of said single piece driver module to an acoustic output surface of said custom-fit ear mold shell, wherein said at least one sound bore is acoustically coupled via a plurality of sound ducts within a body portion of said single piece driver module to said plurality of driver ports; and
   sealing said driver assembly into said custom-fit ear mold shell.

6. The method of claim 5, wherein said portion of said single piece driver module fabricated from said elastomeric material is comprised of at least one of said plurality of driver ports and said acoustic output member.

7. The method of claim 5, wherein said portion of said single piece driver module fabricated from said elastomeric material is comprised of said plurality of driver ports, said acoustic output member and said body portion of said single piece driver module.

8. A method of fabricating a custom-fit in-ear-monitor (IEM), the method comprising the steps of:
   obtaining an ear mold for a specific end user;
   fabricating a custom-fit ear mold shell based on said ear mold;
   fabricating a single piece driver module, wherein said step of fabricating said single piece driver module further comprises the steps of fabricating at least a portion of said single piece driver module from an elastomeric material and fabricating at least one locking feature on an external surface of said single piece driver module, wherein said at least one locking feature is configured to capture and hold said single piece driver module within said custom-fit ear mold shell;
   installing a plurality of drivers into a plurality of driver ports of said single piece driver module to form a driver assembly;
   electrically connecting said plurality of drivers to a crossover circuit, wherein said crossover circuit is configured to receive an electrical signal from an audio source that is external to said custom-fit IEM and to provide separate input signals to each of said plurality of drivers based on said electrical signal;
   installing said driver assembly and said crossover circuit into said custom-fit ear mold shell, wherein said step of installing said driver assembly further comprises the step of acoustically coupling at least one sound bore corresponding to an acoustic output member of said single piece driver module to an acoustic output surface of said custom-fit ear mold shell, wherein said at least one sound bore is acoustically coupled via a plurality of sound ducts within a body portion of said single piece driver module to said plurality of driver ports; and
   sealing said driver assembly into said custom-fit ear mold shell.

9. A method of fabricating a custom-fit in-ear-monitor (IEM), the method comprising the steps of:
   obtaining an ear mold for a specific end user;
   fabricating a custom-fit ear mold shell based on said ear mold;
   fabricating a single piece driver module, wherein said step of fabricating said single piece driver module further comprises the steps of:
      fabricating at least a portion of said single piece driver module from an elastomeric material;
      forming a first sound bore and a second sound bore within an acoustic output member of said single piece driver module;
      forming a first sound duct of a plurality of sound ducts within a body portion of said single piece driver module, wherein said first sound duct acoustically couples a first driver port of a plurality of driver ports of said single piece driver module to said first sound bore of said acoustic output member; and
      forming a second sound duct of said plurality of sound ducts within said body portion of said single piece driver module, wherein said second sound duct acoustically couples a second driver port of said plurality of driver ports to said second sound bore of said acoustic output member;
   installing a plurality of drivers into said plurality of driver ports of said single piece driver module to form a driver assembly;
   electrically connecting said plurality of drivers to a crossover circuit, wherein said crossover circuit is configured to receive an electrical signal from an audio source that is external to said custom-fit IEM and to provide separate input signals to each of said plurality of drivers based on said electrical signal;

installing said driver assembly and said crossover circuit into said custom-fit ear mold shell, wherein said step of installing said driver assembly further comprises the steps of acoustically coupling said first sound bore to an acoustic output surface of said custom-fit ear mold shell via said first sound duct and acoustically coupling said second sound bore to said acoustic output surface of said custom-fit ear mold shell via said second sound duct; and sealing said driver assembly into said custom-fit ear mold shell.

10. The method of claim 9, further comprising the step of forming a third sound duct of said plurality of sound ducts within said body portion of said single piece driver module, wherein said third sound duct acoustically couples a third driver port of said plurality of driver ports to said second sound bore of said acoustic output member.

11. The method of claim 10, further comprising the steps of selecting and coupling a high-frequency driver to said first driver port, selecting and coupling a mid-frequency driver to said second driver port, and selecting and coupling a low-frequency driver to said third driver port.

12. The method of claim 9, said step of forming said first sound bore further comprising the step of forming said first sound bore with a first circular cross-section, and said step of forming said second sound bore further comprising the step of forming said second sound bore with a second circular cross-section.

13. The method of claim 12, further comprising the step of selecting said first circular cross-section to be larger than said second circular cross-section.

14. The method of claim 9, said step of forming said first sound bore and said second sound bore further comprising the step of forming said first sound bore to be concentric with said second sound bore.

15. The method of claim 9, said step of forming said first sound bore further comprising the step of forming said first sound bore with a shaped, non-circular cross-section, and said step of forming said second sound bore further comprising the step of forming said second sound bore with a circular cross-section.

16. The method of claim 9, said step of forming said first sound bore further comprising the step of forming said first sound bore with a first shaped, non-circular cross-section, and said step of forming said second sound bore further comprising the step of forming said second sound bore with a second shaped, non-circular cross-section.

17. The method of claim 9, further comprising the step of mounting a printed circuit board (PCB) containing said crossover circuit to said single piece driver module.

18. A method of fabricating a custom-fit in-ear-monitor (IEM), the method comprising the steps of:
obtaining an ear mold for a specific end user;
fabricating a custom-fit ear mold shell based on said ear mold;
installing a plurality of drivers into a plurality of driver ports of a single piece driver module to form a driver assembly;
electrically connecting said plurality of drivers to a crossover circuit, wherein said crossover circuit is configured to receive an electrical signal from an audio source that is external to said custom-fit IEM and to provide separate input signals to each of said plurality of drivers based on said electrical signal;
installing said driver assembly and said crossover circuit into said custom-fit ear mold shell, wherein said step of installing said driver assembly further comprises the steps of:
integrating said crossover circuit into a cable socket, wherein said cable socket is integrated into said custom-fit ear mold shell; and
acoustically coupling at least one sound bore corresponding to an acoustic output member of said single piece driver module to an acoustic output surface of said custom-fit ear mold shell, wherein said at least one sound bore is acoustically coupled via a plurality of sound ducts within a body portion of said single piece driver module to said plurality of driver ports; and
sealing said driver assembly into said custom-fit ear mold shell.

19. A method of fabricating a custom-fit in-ear-monitor (IEM), the method comprising the steps of:
obtaining an ear mold for a specific end user;
fabricating a custom-fit ear mold shell based on said ear mold;
installing a plurality of drivers into a plurality of driver ports of a single piece driver module to form a driver assembly;
electrically connecting said plurality of drivers to a crossover circuit, wherein said crossover circuit is configured to receive an electrical signal from an audio source that is external to said custom-fit IEM and to provide separate input signals to each of said plurality of drivers based on said electrical signal;
installing said driver assembly and said crossover circuit into said custom-fit ear mold shell, wherein said step of installing said driver assembly further comprises the step of acoustically coupling at least one sound bore corresponding to an acoustic output member of said single piece driver module to an acoustic output surface of said custom-fit ear mold shell, wherein said at least one sound bore is acoustically coupled via a plurality of sound ducts within a body portion of said single piece driver module to said plurality of driver ports; and
sealing said driver assembly into said custom-fit ear mold shell, wherein said step of sealing said driver assembly into said custom-fit ear mold shell further comprises the step of filling said custom-fit ear mold shell with a filler, wherein said filler captures and holds said driver assembly and said crossover circuit within said custom-fit ear mold shell.

20. A method of fabricating a custom-fit in-ear-monitor (IEM), the method comprising the steps of:
obtaining an ear mold for a specific end user;
fabricating a custom-fit ear mold shell based on said ear mold;
installing a plurality of drivers into a plurality of driver ports of a single piece driver module to form a driver assembly;
electrically connecting said plurality of drivers to a crossover circuit, wherein said crossover circuit is configured to receive an electrical signal from an audio source that is external to said custom-fit IEM and to provide separate input signals to each of said plurality of drivers based on said electrical signal;
installing said driver assembly and said crossover circuit into said custom-fit ear mold shell, wherein said step of installing said driver assembly further comprises the step of acoustically coupling at least one sound bore corresponding to an acoustic output member of said single piece driver module to an acoustic output surface of said custom-fit ear mold shell, wherein said at least one sound bore is acoustically coupled via a plurality of sound ducts within a body portion of said single piece driver module to said plurality of driver ports; and sealing said driver assembly into said custom-fit ear mold shell, wherein said step of sealing said driver assembly into said custom-fit ear mold shell further comprises the step of closing an opening in said custom-fit ear mold shell with a pre-fabricated faceplate.

21. A method of fabricating a custom-fit in-ear-monitor (IEM), the method comprising the steps of:

obtaining an ear mold for a specific end user;

fabricating a custom-fit ear mold shell based on said ear mold;

installing a plurality of drivers into a plurality of driver ports of a single piece driver module to form a driver assembly;

electrically connecting said plurality of drivers to a crossover circuit, wherein said crossover circuit is configured to receive an electrical signal from an audio source that is external to said custom-fit IEM and to provide separate input signals to each of said plurality of drivers based on said electrical signal;

installing said driver assembly and said crossover circuit into said custom-fit ear mold shell, wherein said step of installing said driver assembly further comprises the step of acoustically coupling at least one sound bore corresponding to an acoustic output member of said single piece driver module to an acoustic output surface of said custom-fit ear mold shell, wherein said at least one sound bore is acoustically coupled via a plurality of sound ducts within a body portion of said single piece driver module to said plurality of driver ports;

sealing said driver assembly into said custom-fit ear mold shell; and blocking off one of said plurality of driver ports of said single piece driver module prior to sealing said driver assembly into said custom-fit ear mold shell.

22. A method of fabricating a custom-fit in-ear-monitor (IEM), the method comprising the steps of:

obtaining an ear mold for a specific end user;

fabricating a custom-fit ear mold shell based on said ear mold;

installing a plurality of drivers into a plurality of driver ports of a single piece driver module to form a driver assembly;

electrically connecting said plurality of drivers to a crossover circuit, wherein said crossover circuit is configured to receive an electrical signal from an audio source that is external to said custom-fit IEM and to provide separate input signals to each of said plurality of drivers based on said electrical signal;

installing said driver assembly and said crossover circuit into said custom-fit ear mold shell, wherein said step of installing said driver assembly further comprises the step of acoustically coupling at least one sound bore corresponding to an acoustic output member of said single piece driver module to an acoustic output surface of said custom-fit ear mold shell, wherein said at least one sound bore is acoustically coupled via a plurality of sound ducts within a body portion of said single piece driver module to said plurality of driver ports;

sealing said driver assembly into said custom-fit ear mold shell; and acoustically coupling one of said plurality of driver ports to an ambient environment external to said custom-fit IEM prior to sealing said driver assembly into said custom-fit ear mold shell.

23. A method of fabricating a custom-fit in-ear-monitor (IEM), the method comprising the steps of:

obtaining an ear mold for a specific end user;

fabricating a custom-fit ear mold shell based on said ear mold;

installing a plurality of drivers into a plurality of driver ports of a single piece driver module to form a driver assembly;

electrically connecting said plurality of drivers to a crossover circuit, wherein said crossover circuit is configured to receive an electrical signal from an audio source that is external to said custom-fit IEM and to provide separate input signals to each of said plurality of drivers based on said electrical signal;

installing said driver assembly and said crossover circuit into said custom-fit ear mold shell, wherein said step of installing said driver assembly further comprises the step of acoustically coupling at least one sound bore corresponding to an acoustic output member of said single piece driver module to an acoustic output surface of said custom-fit ear mold shell, wherein said at least one sound bore is acoustically coupled via a plurality of sound ducts within a body portion of said single piece driver module to said plurality of driver ports, wherein said step of installing said driver assembly into said custom-fit ear mold shell further comprises the step of adjusting an acoustic output extension slidably mounted to said acoustic output member; and sealing said driver assembly into said custom-fit ear mold shell.

24. A method of fabricating a custom-fit in-ear-monitor (IEM), the method comprising the steps of:

creating an ear mold for a specific end user;

fabricating a custom-fit ear mold shell based on said ear mold, wherein said step of fabricating said custom-fit ear mold shell further comprises the step of forming a cavity within said custom-fit ear mold shell configured to receive and couple to a preconfigured driver assembly, and wherein an acoustic output surface of said custom-fit ear mold shell is created during the step of fabricating said custom-fit ear mold shell;

installing said preconfigured driver assembly into said custom-fit ear mold shell, wherein said step of installing said preconfigured driver assembly further comprises the step of acoustically coupling at least one sound bore corresponding to an acoustic output member of said preconfigured driver assembly to said acoustic output surface of said custom-fit ear mold shell; and sealing said preconfigured driver assembly into said custom-fit ear mold shell.

25. The method of claim 24, wherein the steps of fabricating said custom-fit ear mold shell and forming said cavity within said custom-fit ear mold shell occur in the same processing step.

* * * * *